(12) United States Patent
Kim et al.

(10) Patent No.: US 7,715,842 B2
(45) Date of Patent: May 11, 2010

(54) SUPPORTING HANDOVER OF MOBILE TERMINAL

(75) Inventors: Yong Ho Kim, Bucheon-si (KR); Yong Won Kwak, Anyang-si (KR); Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 362 days.

(21) Appl. No.: 11/399,738

(22) Filed: Apr. 7, 2006

(65) Prior Publication Data

US 2006/0229075 A1    Oct. 12, 2006

(30) Foreign Application Priority Data

| Apr. 9, 2005 | (KR) | ............... 10-2005-0029750 |
| Sep. 3, 2005 | (KR) | ............... 10-2005-0081990 |
| Mar. 3, 2006 | (KR) | ............... 10-2006-0020298 |

(51) Int. Cl.
*H04W 36/00* (2006.01)
(52) U.S. Cl. .................. 455/436; 455/442; 371/331
(58) Field of Classification Search ............. 455/436, 455/442; 370/331
See application file for complete search history.

(56) References Cited

U.S. PATENT DOCUMENTS

| 6,882,677 B2* | 4/2005 | Dehner et al. ............... 375/132 |
| 7,068,621 B2* | 6/2006 | Bouet et al. ................. 370/328 |
| 7,496,364 B2* | 2/2009 | Hoghooghi et al. ......... 455/436 |

| 2004/0139224 A1* | 7/2004 | Nishimura et al. .......... 709/238 |
| 2004/0260805 A1* | 12/2004 | Aoyama et al. ............. 709/224 |
| 2006/0262751 A1* | 11/2006 | Vermola et al. ............. 370/331 |

FOREIGN PATENT DOCUMENTS

| EP | 1 213 941 A2 | 6/2002 |
| WO | WO 00/60895 | 10/2000 |

OTHER PUBLICATIONS

Freescale Semiconductor, Inc.: "Optimal Beacon & Architecture for MIH", IEEE 802.21 Working Group [online], Mar. 4, 2005 [retrieved on May 15, 2007]. Retrieved from the Internet: <URL:http://www.ieee802.org/21/doctree/2005-03_meeting_docs/21-04-0164-04-0000-Freescale_March2005.ppt>, slides 6, 7, 9-14, 18, 20, 24.

(Continued)

*Primary Examiner*—Nghi H Ly
(74) *Attorney, Agent, or Firm*—Lee, Hong, Degerman, Kang & Waimey

(57) ABSTRACT

The present invention relates to supporting a handover of a mobile terminal. Preferably, the present invention performs a scan of a neighboring network different from a current network of the mobile terminal to determine the presence of an accessible link of the neighboring network for performing a handover, wherein the mobile terminal comprises a heterogeneous network handover module that is configured to provide convergence of information from at least one network interface module associated with one of a homogeneous and heterogeneous network into a unified presentation. An information message is then received from the neighboring network, wherein the information message comprises an information element associated with whether the neighboring network is capable of communicating with the heterogeneous network handover module of the mobile terminal.

16 Claims, 11 Drawing Sheets

OTHER PUBLICATIONS

Hoghooghi, M. A. et al.: "Media Independent Handover Functions and Services Specification", IEEE 802.21 Working Group [online], Mar. 14, 2005 [retrieved on May 15, 2007], Retrieved from the Internet: <URL:http://www.ieee802.org/21/doctree/2005-03_meeting_docs/21-05-0253-01-0000-joint-harmonized-contribution.doc>, p. 17, section 3.2.5.1.

Wu, J. et al.: "Enhancement of Capability Negotiation for Handover", IEEE 802.16 Broadband Wireless Access Working Group [online], Jan. 24, 2005 [retrieved on May 15, 2007]. Retrieved from the Internet: <URL:http://www.ieee802.org/16/tge/contrib/C80216e-05_012.pdf>. p. 1.

Zhang, H. et al.: "Soft Handover and Fast BS Switching Procedure", IEEE 802.16 Broadband Wireless Access Working Group [online], Jun. 25, 2004.

Liebsch, M. et al.: "Candidate Access Router Discovery", IETF Seamoby Working Group, DRAFT-IETF-SEAMOBY-CARD-PROTOCOL-08.TXT, XPO015027181 [online], Sep. 2004, [retrieved on May 15, 2007]. Retrieved from the Internet: <URL: http://tools.ietf.org/html/draft-ietf-seamoby-card-protocol,08>, pp. 4-6, 40, 45, 47; figs. 1, A.1, B.2, B.3.

* cited by examiner

SUPPORTING HANDOVER OF MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2005-0029750, filed on Apr. 9, 2005, Korean Application No. 10-2005-0081990, filed on Sep. 3, 2005, and Korean Application No. 10-2006-0020298, filed on Mar. 3, 2006, the contents of which are hereby incorporated by reference herein in their entirety.

FIELD OF THE INVENTION

The present invention relates to communicating information for media independent handover (MIH), and more particularly, to supporting handover of a mobile terminal.

BACKGROUND OF THE INVENTION

A broadband wireless access system according to a related art will be explained in general as follows. Unlike the conventional 2G or 3G mobile communication systems, an IEEE 802.16e system, for which international standardization of a broadband wireless access system is in progress, is not provided with a hierarchical structure for a home location register (HLR), a visitor location register (VLR), a mobile switching center (MSC), a base station controller (BSC), a radio network controller (RNC) and the like. However, the IEEE 802.16e system includes a mobile subscriber station (MSS) as a mobile terminal, a base station (BS) and an authentication service authorization (ASA) as an authentication managing server. Furthermore a common physical layer (PHY) and a medium access control (MAC) layer are defined between the base station and the mobile subscriber station.

FIG. 1 is a diagram of a frame structure for an orthogonal frequency division multiple access (OFDMA) physical layer in a broadband wireless access system. Referring to FIG. 1, a downlink subframe starts with a preamble used for synchronization and equalization in a physical layer. Following, the preamble is a broadcast-formatted downlink map (DL-MAP) message defining positions and usages of bursts allocated to a downlink and uplink and a frame control header (FCH). An uplink map (UL-MAP) message follows the DL-MAP and FCH to define a structure of an entire frame.

Examples of DL-MAP and UL-MAP messages are shown in Table 1 and Table 2, respectively.

TABLE 1

| Syntax | Size | Notes |
| --- | --- | --- |
| DL-MAP_Message_Format( ) { | | |
| Management Message Type = 2 | 8 bits | |
| PHY Synchronization Field | variable | See appropriate PHY specification. |
| DCD Count | 8 bits | |
| Base Station ID | 48 bits | |
| Begin PHY Specific Section { | | See applicable PHY section. |
| for(i=1; i <= n;i++) { | | For each DL-MAP element 1 to n. |
| DL-MAP-IE( ) | variable | See corresponding PHY specification. |
| } | | |
| } | | |

TABLE 1-continued

| Syntax | Size | Notes |
| --- | --- | --- |
| if !(byte boundary) { | | |
| Padding Nibble | 4 bits | Padding to reach byte boundary. |
| } | | |
| } | | |

TABLE 2

| Syntax | Size | Notes |
| --- | --- | --- |
| UL-MAP_Message_Format( ) { | | |
| Management Message Type = 3 | 8 bits | |
| Uplink Channel ID | 8 bits | |
| UCD Count | 8 bits | |
| Allocation Start Time | 32 bits | |
| Begin PHY Specific Section { | | See applicable PHY section. |
| for(i=1; i <= n;i++) { | | For each UL-MAP element 1 to n. |
| UL-MAP-IE( ) | variable | See corresponding PHY specification. |
| } | | |
| } | | |
| if !(byte boundary) { | | |
| Padding Nibble | 4 bits | Padding to reach byte boundary. |
| } | | |
| } | | |

In a burst mode physical layer, a DL-MAP message defines usages of bursts allocated to a downlink interval and a UL-MAP message defines usages of bursts allocated to an uplink interval. For information elements configuring the DL-MAP message, as shown in Table 3, a downlink traffic interval is identified at a user end by a downlink interval usage code (DIUC), a connection identifier (CID) and burst position information (e.g. subchannel offset, symbol offset, subchannel no., and symbol no.). For information elements configuring the UL-MAP message, as shown in Table 4, usage is determined by an uplink interval usage code (UIUC) per connection identifier (CID). A position of a corresponding interval is regulated by duration. In this case, a usage per interval is determined according a UIUC value used in the UL-MAP. Each interval starts at a point having some distance from a previous information element (IE) start point regulated by the UL-MAP IE.

TABLE 3

| Syntax | Size | Notes |
| --- | --- | --- |
| DL-MAP_IE( ) { | | |
| DIUC | 4 bits | |
| if (DIUC == 15) { | | |
| Extended DIUC dependent IE | variable | |
| } else { | | |
| if (INC_CID == 1) { | | The DL-MAP starts with INC_CID = 0. INC_CID is toggled between 0 and 1 by the CID-SWITCH_IE( ). |
| N_CID | 8 bits | Number of CIDs assigned for this IE |
| for (n=0; n<_CID; n++) { | | |
| CID | 16 bits | |
| } | | |
| } | | |

TABLE 3-continued

| Syntax | Size | Notes |
| --- | --- | --- |
| OFDMA symbol offset | 8 bits | |
| Subchannel offset | 6 bits | |
| Boosting | 3 bits | 000: normal (not boosted); 001: +6 dB; 010: −6 dB; 011: +9 dB; 100: +3 dB; 101: −3 dB; 110: −9 dB; 111: −12 dB |
| No. OFDMA Symbols | 7 bits | |
| No. Subchannels | 6 bits | |
| Reception Coding Indication | 2 bits | 0b00 - No repetition coding<br>0b01 - Repetition coding of 2 used<br>0b10 - Repetition coding of 4 used<br>0b11 - Repetition coding of 6 used |
| } | | |
| } | | |

TABLE 4

| Syntax | Size | Notes |
| --- | --- | --- |
| UL-MAP_IE( ) { | | |
| CID | 16 bits | |
| UIUC | 4 bits | |
| If (UIUC == 12) { | | |
| OFDMA symbol offset | 8 bits | |
| Subchannel offset | 7 bits | |
| No. OFDMA Symbols | 7 bits | |
| No. Subchannels | 7 bits | |

TABLE 4-continued

| Syntax | Size | Notes |
| --- | --- | --- |
| Ranging Method | 2 bits | 0b00 - Initial ranging over two symbols 0b01 - Initial Ranging over four symbols 0b10 - BW Request/Periodic Ranging over one symbol 0b11 - BW Request/Periodic Ranging over three symbols |
| reserved | 1 bit | Shall be set to zero |
| } else if (UIUC == 14) { | | |
| CDMA_Allocation_IE( ) | 32 bits | |
| else if (UIUC == 15) | | |
| { | | |
| Extended UIUC dependent IE | variable | |
| } else { | | |
| Duration | 10 bits | In OFDMA slots |
| Reception Coding Indication | 2 bits | 0b00 - No repetition coding 0b01 - Repetition coding of 2 used 0b10 - Repetition coding of 4 used 0b11 - Repetition coding of 6 used |
| } | | |
| Padding nibble, if needed | 4 bits | Completing to nearest byte, shall be set to 0. |
| } | | |

The frame control header (FCH) preceding the DL-MAP is a header that indicates coding information and a length of the DL-MAP. Table 5 shows a frame structure of the FCH.

TABLE 5

| Syntax | Size | Notes |
| --- | --- | --- |
| DL_Frame_Prefix_Format( ) { | | |
| Used subchannel bitmap | 6 bits | Bit #0: Subchannels 0-11 are used<br>Bit #1: Subchannels 12-19 are used<br>Bit #2: Subchannels 20-31 are used<br>Bit #3: Subchannels 32-39 are used<br>Bit #4: Subchannels 40-51 are used<br>Bit #5: Subchannels 52-59 are used |
| Ranging_Change_Indication | 1 bit | |
| Repetition_Coding_Indication | 2 bit | 00 - No repetition coding on DL-MAP<br>01 - Repetition coding of 2 used on DL-MAP<br>10 - Repetition coding of 4 used on DL-MAP<br>11 - Repetition coding of 6 used on DL-MAP |
| Coding_Indication | 3 bits | 0b000 - CC encoding used on DL-MAP<br>0b001 - BCC encoding used on DL-MAP<br>0b010 - CTC encoding used on DL-MAP<br>0b011 - ZT CC used on DL-MAP<br>0b100 to 0b111 - Reserved |
| DL_MAP_Length | 8 bits | |
| reserved | 4 bits | Shall be set to zero |
| } | | |

Table 6 shows an example of a neighbor advertisement (MOB_NBR-ADV) message as a broadcast message of a neighbor base station. A base station periodically broadcasts information about neighbor base stations via the MOB_NBR-ADV message. A mobile subscriber station receives the message and refers to it for scanning and handover.

TABLE 6

| Syntax | Size | Notes |
| --- | --- | --- |
| MOB_NBR-ADV_Message_Format( ) { | | |

TABLE 6-continued

| Syntax | Size | Notes |
|---|---|---|
| Management Message Type = 53 | 8 bits | |
| Skip-Optional-Fields bitmap | 8 bits | Bit [0]: if set to 1, omit Operator ID field<br>Bit [1]: if set to 1, omit NBR BS ID field<br>Bit [2]: if set to 1, omit HO process optimization field<br>Bit [3]: if set to 1, omit QoS related fields<br>Bits [4] to [7]: reserved |
| If (Skip-Optional-Fields-[0]=0) {<br>Operator ID | 24 bits | Unique ID assigned to the operator |
| }<br>Configuration Change Count | 8 bits | Incremented each time the information for the associated neighbor BS has changed. |
| Fragmentation Index | 4 bits | This field indicates the current fragmentation index. |
| Total Fragmentation | 4 bits | This field indicates the total number of fragmentations. |
| N_NEIGHBORS | 8 bits | |
| For (j=0 ; j<N_NEIGHBORS ; j++) { | | |
| Length | 8 bits | Length of message information within the iteration of N_NEIGHBOR in bytes. |
| PHY Profile ID | 8 bits | Aggregated IDs of Co-located FA Indicator, FA Configuration Indicator, FFT size, Band-width, Operation Mode of the starting sub-channelization of a frame and Channel Number |
| if (FA Index Indicator == 1) {<br>FA Index | 8 bits | This field, Frequency Assignment Index, is present only the FA Index Indicator in PHY Profile ID is set.<br>Otherwise, the neighbor BS has the same FA Index or the center frequency is indicated using the TLV encoded information. |
| }<br>if (BS EIRP Indicator == 1) {<br>BS EIRP | 8 bits | Signed Integer from −128 to 127 in unit of dBm. This field is present only if the BS EIRP indicator is set in PHY Profile ID. Otherwise, the BS has the same EIRP as the serving BS. |
| }<br>if (Skip-Optional-Fields[1]=0) {<br>Neighbor BSID | 24 bits | This is an optional field for OFDMA PHY and it is omitted or skipped if Skip Optional Fields Flag = 1. |
| }<br>Preamble Index/Subchannel Index | 8 bits | The index for the PHY profile specific preamble. Preamble Index is PHY specific for SCa and OFDMA. The value of Preamble Index shall be ignored and a value of 0x00 shall be used for OFDM PHY. For the SCa and OFDMA PHY this parameter defines the PHY specific preamble. For the OFDM PHY the 5 LSB contain the active DL subchannel index. The 3 MSB shall be reserved and set to 0b000. |
| if (Skip-Optional-Fields[2]=0) {<br>HO Process Optimization | 8 bits | HO Process Optimization is provided as part of this message is indicative only. HO process requirements may change at time of actual HO.<br>For each Bit location, a value of 0 indicates the associated reentry management messages shall be required, a value of 1 indicates the reentry management message may be omitted.<br>Regardless of the HO Process Optimization TLV settings, the target BS may send unsolicited SBC-RSP and/or REG-RSP management messages.<br>Bit #0: Omit SBC-REQ/RSP management messages during current reentry processing<br>Bit #1: Omit PKM-REQ/RSP management messages during current reentry processing<br>Bit #2: Omit REG-REQ/RSP management messages during current reentry processing<br>Bit #3: Omit Network Address Acquisition management messages during current reentry processing<br>Bit #4: Omit Time of Day Acquisition management messages during current reentry processing<br>Bit #5: Omit TFTP management messages during current reentry processing<br>Bit #6: Full service and operational state transfer or sharing between serving BS and target BS (ARQ, timers, counters, MAC state machines, etc.<br>Bit #7: Reserved |
| } | | |

TABLE 6-continued

| Syntax | Size | Notes |
|---|---|---|
| if (Skip-Optional-Fields-[3]=0) { | | |
| Scheduling Service Supported | 4 bits | Bitmap to indicate if BS supports a particular scheduling service, 1 indicates support, 0 supports not support<br>bit 0: Unsolicited Grant Service (UGS)<br>bit 1: Real-time Polling Service (rtPS)<br>bit 2: Non-real-time Polling service (nrtPS)<br>bit 3: Best Effort value of ?000? indicates no information on service available |
| Available Radio Resource | 4 bits | Percentage of reported average available subchannels and symbols resources per frame<br>0000: 0%<br>0001: 20%<br>0010: 40%<br>0011: 60%<br>0100: 80%<br>0101: 100%<br>0110-1110: reserved<br>0110-1110: reserved value of 1111 indicates no information on service available |
| Reserved | 8 bits | Shall be set to zero |
| } | | |
| DCD Configuration Change Count | 4 bits | This represents the 4 LS bits of the Neighbor BS current DCD configuration change count |
| UCD Configuration Change Count | 4 bits | This represents the 4 LS bits of the Neighbor BS current UCD configuration change count |
| TLV Encoded Neighbor information | variable | TLV specific |
| } | | |
| } | | |

Table 7 and Table 8 are embodiments of a basic capability request (SBC-REQ) message and a basic capability response (SBC-RSP) message, respectively. The mobile subscriber station having received the DL-MAP and UL-MAP executes ranging for a network access procedure and transmits an SBC-REQ message to the base station to initiate a negotiation for basic capability. In response to the negotiation, the base station sends an SBC-RSP message about a portion coinciding with its performance.

TABLE 7

| Syntax | Size | Notes |
|---|---|---|
| SBC-REQ_Message_Format( ) { | | |
| Management Message Type = 26 | 8 bits | |
| TLV Encoded Information | variable | TLV specific |
| } | | |

TABLE 8

| Syntax | Size | Notes |
|---|---|---|
| SBC-RSP_Message_Format( ) { | | |
| Management Message Type = 27 | 8 bits | |
| TLV Encoded Attributes | variable | TLV specific |
| } | | |

Once the negotiation for basic capability is completed, the mobile subscriber station executes a registration procedure via a registration request (MOB-REG-REQ) message and a registration response (MOB-REG-RSP) message. Table 9 and Table 10 show examples of the MOB-REG-REQ and MOB-REG-RSP messages, respectively.

TABLE 9

| Syntax | Size | Notes |
|---|---|---|
| REG-REQ_Message_Format( ) { | | |
| Management Message Type = 4 | 8 bits | |
| Downlink Channel ID | 8 bits | |
| TLV Encoded Information | variable | TLV specific |
| } | | |

TABLE 10

| Syntax | Size | Notes |
|---|---|---|
| REG-RSP_Message_Format( ) { | | |
| Management Message Type = 5 | 8 bits | |
| Uplink Channel ID | 8 bits | |
| TLV Encoded Information | variable | TLV specific |
| } | | |

Media independent handover (MIH) technology will now explained. An object of an IEEE 802.21 system, in progress for the international standardization of inter-heterogeneous-network media independent handover, is to enhance user convenience for mobile terminal devices by providing seamless handover and service continuity between heterogeneous networks. An MIH function, event trigger, command service and information service (IS) are defined as basic requirements of the IEEE 802.21 system.

A mobile subscriber station is a multi-node that supports at least one interface type, wherein an interface can be implemented in various types. Possible interface types include a wire-line type interface such as an IEEE 802.3-based Ethernet, wireless interface types based on IEEE 802.XX including IEEE 802.11, IEEE 802.15, IEEE 802.16 or the like, and interfaces defined by a cellular standardization organization such as 3GPP and 3GPP2, for example.

FIG. 2 is an exemplary diagram of a multi-mode mobile subscriber station. Referring to FIG. 2, a multi-mode mobile subscriber station includes a physical layer (PHY) per mode and a medium access control (MAC) layer per mode. Furthermore, an MIH layer lies below an IP layer.

Media independent handover (MIH) is defined between IEEE 802-series interfaces or between an IEEE 802-series interface and a non-IEEE 802-series interface, such as a 3GPP or 3GPP2 interface. Also, a mobility supporting protocol of an upper layer such as a Mobile IP and session initiation protocol (SIP) is supported for the seamless handover service.

A network registration procedure in initializing a broadband wireless access system is explained as follows. FIG. 3 is a flowchart of a mobile station initializing procedure in a broadband wireless access system. Referring to FIG. 3, once power of a mobile subscriber station is turned on, the mobile subscriber station searches a downlink channel and acquires uplink/downlink synchronization with a base station via a DL-MAP and a UL-MAP (1). The mobile subscriber station adjusts uplink transmission parameters by ranging with the base station via RNG-REQ and RNG-RSP messages, and the base station allocates a basic management connection identifier (CID) and a primary management CID to the mobile subscriber station (2). The mobile subscriber station then negotiates for a basic capability with the base station via SBC-REQ and SBC-RSP messages (3). Afterward, authorization is carried out on the mobile subscriber station (4). The mobile subscriber station then performs a registration procedure to the base station via REG-REQ and REG-RSP messages, wherein the base station allocates a secondary management CID to the mobile subscriber station managed by an Internet protocol (IP) (5). Once an IP connection is created (6), a current date and time are set (7). A configuration file of the mobile subscriber station is then downloaded from a trivial file transfer protocol (TFTP) server (8), and a connection for a prepared service is created (9).

In media independent handover (MIH), an MIH function is placed below an IP layer and facilitates a handover handling process using a trigger event and an input value from a second layer (Layer 2), such as information of other networks and the like. The MIH function can include input values based on user policy and configuration that may influence a handover process. General interfaces are defined between the MIH function and a third layer (Layer 3) entity such as a mobile Internet protocol (Mobile IP) and a session initiation protocol (SIP). These interfaces provide information about a first layer (physical layer), the second layer (Layer 2) (MAC layer) and mobility management. The MIH acquires information about lower layers and a network with the help of the event and information service. Accordingly, the MIH function should be placed in a higher layer to monitor and control statuses of other links within the mobile subscriber station. FIG. 4 is a diagram of functional entities and a transport protocol of a terminal including an MIH function and a network, in which dotted lines indicate a primitive, an event trigger and the like.

An event trigger for handover between heterogeneous networks is explained as follows. For fast handover, a network layer needs to use information from a link layer to re-establish a connection as soon as possible. A link layer event helps to estimate a user's movement and may help a mobile subscriber station and network prepare handover in advance. A trigger for handover may begin with a physical layer (PHY) and a medium access control layer (MAC). An origin of this trigger may be a local stack or a remote stack. FIG. 5 is a diagram of a trigger model.

An event trigger provides a state of a current signal, a state change of another network and an estimated change. The event trigger also provides information regarding a change between a physical layer and a medium access control layer and attribute changes of a specific network. Event types can be classified into the following: (1) PHY layer event; (2) MAC layer event; (3) Management event; (4) L3 event; and (5) Application event.

Basic trigger events will now be explained. A "Link_Up" trigger event occurs when a Layer 2 (L2) connection is established on a specific link interface and when Layer 3 (L3) packets can be transferred from a higher layer. In this case, it is decided that all L2 configurations configuring the link are completed. Event origins are a Local MAC and a Remote MAC. Parameters are shown in Table 11.

TABLE 11

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| NetworkIdentifier | Media Specific | Network Identifier usable in detecting change of subnet |
| IP_Renewal_Indicator | | Indicating necessity of changing temporary IP address. 0: change unnecessary 1: change necessary |

A "Link Down" trigger event occurs when an L2 connection is released on a specific interface and when it is no longer able to transfer L3 packets. An event origin is a Local MAC. Parameters are shown in Table 12.

TABLE 12

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |

TABLE 12-continued

| Name | Type | Description |
| --- | --- | --- |
| MacOldAccessRouter | MAC Address | MAC address of old access router |
| ReasonCode | | Reason why link is released |

A "Link Going Down" trigger event occurs when it is estimated that an L2 connection is going to link down within a specific time. The "Link Going Down" trigger event may be a signal for initializing a handover procedure. Event origins are a Local MAC and a Remote MAC. Parameters are shown in Table 13.

TABLE 13

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| TimeInterval | Time in msecs | Estimated time for Link_Up |
| ConfidenceLevel | % | Estimated level for Link_Down of link in a specific time |
| UniqueEventIdentifier | | Used in case that Event rollback occurs |

A "Link Going Up" trigger event occurs when it is estimated that an L2 connection is going to link up within a specific time. The "Link Going Up" trigger event is used in case when a long duration of time is required for a network to be initialized. Event origins are a Local MAC and a Remote MAC. Parameters are shown in Table 14.

TABLE 14

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| TimeInterval | Time in msecs | Estimated time for Link_Up |
| ConfidenceLevel | % | Estimated level for Link_Up of link in a specific time |
| UniqueEventIdentifier | | Used in case that Event rollback occurs |

A "Link_Available" trigger event indicates that a new specific link is usable or available. Furthermore, the "Link_Available" event indicates the possibility that a new base station or access point (AP) or point of attachment (POA) can provide a link having a better quality than that of a base station or AP or POA currently accessed by a mobile subscriber station. Event origins are a Local MAC and a Remote MAC. Parameters are shown in Table 15.

TABLE 15

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |

TABLE 15-continued

| Name | Type | Description |
| --- | --- | --- |
| IP_Renewal_Indicator | | Indicating necessity of changing temporary IP address.<br>0: change unnecessary<br>1: change necessary |

An information service for inter-heterogeneous-network handover will now be explained. A media independent information service (MIIS) provides a similar frame network on a hierarchical heterogeneous network to facilitate a search and selection of various kinds of present networks. Namely, the media independent information service (MIIS) provides detailed information about a network needed to search and select a network and should be accessible from any kind of networks. The media independent information service (MIIS) should include the following information elements such as link access parameter, security mechanism, neighbor map, location, provider and other access information, cost of link and the like.

FIG. 6 is a flowchart of a procedure for acquiring an information service according to a related art. Referring to FIG. 6, an MIH of a mobile subscriber station (MS) transfers an MIH_info.request message to its MAC to request an information service (S610). The MAC of the mobile subscriber station then transfers an information request frame to a base station (BS) (S620). A MAC of the base station delivers the information request from the mobile subscriber station to its MIH via MIH_Info.indication message (S630). The MIH of the base station then delivers a retained media independent information service to the MAC layer via a MIH_Info.response message (S640). This enables the MAC of the base station to send an information response frame in response to the mobile subscriber station (S650). The MAC of the mobile subscriber station receives the information response frame and delivers contents of the received information service to its MIH via an MIH_Info.confirm message (S660).

However, in the related art for the broadband wireless access system, a multi-mode mobile subscriber station attempting handover to a broadband wireless access system from another interface network (e.g., IEEE 802.11, 3GPP or 3GPP2), a mobile subscriber station attempting handover to another base station in the same broadband wireless access system, or a mobile subscriber station executing an initial network access procedure within a base station of a broadband wireless access system, is unable to know whether an MIH capability of a base station is available. Accordingly, what is needed is an invention that resolves the problems of the related art.

SUMMARY OF THE INVENTION

The present invention is directed to supporting handover of a mobile terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method of supporting a handover of a mobile terminal, the method comprising performing a scan of a neighboring network different from a current network of the mobile terminal to determine the presence of an accessible link of the neighboring network for performing a handover, wherein the mobile terminal comprises a heterogeneous network handover module that is configured to provide convergence of information from at least one network interface module associated with one of a homogeneous and heterogeneous network into a unified presentation, and receiving an information message from the neighboring network, wherein the information message comprises an information element associated with whether the neighboring network is capable of communicating with the heterogeneous network handover module of the mobile terminal.

In one aspect of the invention, if the neighboring network has the heterogeneous network handover capability then the mobile terminal communicates with the neighboring network using a medium access control management message. In another aspect of the invention, the method further comprises providing a scan request from the heterogeneous network handover module to a broadband wireless access network interface prior to performing the scan.

Preferably, the information message is received through a medium access control of the broadband wireless access network interface and communicated to the heterogeneous network handover module. Preferably, the information message from the neighboring network further comprises at least one of an information service support indicator, an event service support indicator and a command service support indicator. Preferably, the information message is one of a broadcast message, a frame check header message, a registration response message, a subscriber station basic capability response message, and a neighbor base station broadcast message.

Preferably, the information element received by the medium access control of the mobile terminal is communicated to the heterogeneous network handover module. Preferably, the medium access control communicates to the heterogeneous network handover module via one of a link available message and a capability indication message.

In accordance with another embodiment of the present invention, a method of supporting a handover of a mobile terminal comprises communicating with a current network, receiving a broadcast message from the current network comprising at least one of heterogeneous networks within a serving base station and heterogeneous networks within a neighboring base station, and providing to a heterogeneous network handover module of the mobile terminal information associated with the heterogeneous networks within a serving base station and heterogeneous networks within a neighboring base station, wherein the heterogeneous network handover module is configured to provide convergence of information from at least one network interface module associated with one of a homogeneous and heterogeneous network into a unified presentation.

In accordance with another embodiment of the present invention, a method of supporting a handover of a mobile terminal comprises transmitting to a current network a request message comprising an information element associated with whether the mobile terminal supports a heterogeneous network handover module that is configured to provide convergence of information from at least one network interface module associated with one of a homogeneous and heterogeneous network into a unified presentation, and receiving from the current network a response message comprising an information element associated with whether the current network is capable of communicating with the heterogeneous network handover module of the mobile terminal.

In accordance with another embodiment of the present invention, a method of supporting a handover of a mobile terminal comprises receiving from the mobile terminal a request message comprising an information element associated with whether the mobile terminal supports a heterogeneous network handover module that is configured to provide convergence of information from at least one network interface module associated with one of a homogeneous and heterogeneous network into a unified presentation, and transmitting to the mobile terminal a response message comprising an information element associated with whether a current network is capable of communicating with the heterogeneous network handover module of the mobile terminal.

In one aspect of the invention, if the current network has the heterogeneous network handover capability then the mobile terminal communicates with the current network using a medium access control management message. In another aspect of the invention, the method further comprises receiving a scan request from the heterogeneous network handover module of the mobile terminal through a broadband wireless access network interface prior to receiving the request message.

Preferably, the response message is transmitted through a medium access control of the broadband wireless access network interface. Preferably, the response message further comprises at least one of an information service support indicator, an event service support indicator and a command service support indicator. Preferably, the response message is one of a broadcast message, a frame check header message, a registration response message, a subscriber station basic capability response message, and a neighbor base station broadcast message.

In accordance with another embodiment of the present invention, a method of supporting a handover of a mobile terminal comprises communicating with the mobile terminal, and transmitting a broadcast message from a current network to the mobile terminal, the broadcast message comprising at least one of heterogeneous networks within a serving base station and heterogeneous networks within a neighboring base station, wherein the mobile terminal provides to a heterogeneous network handover module of the mobile terminal information associated with the heterogeneous networks within a serving base station and heterogeneous networks within a neighboring base station, wherein the heterogeneous network handover module is configured to provide convergence of information from at least one network interface module associated with one of a homogeneous and heterogeneous network into a unified presentation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
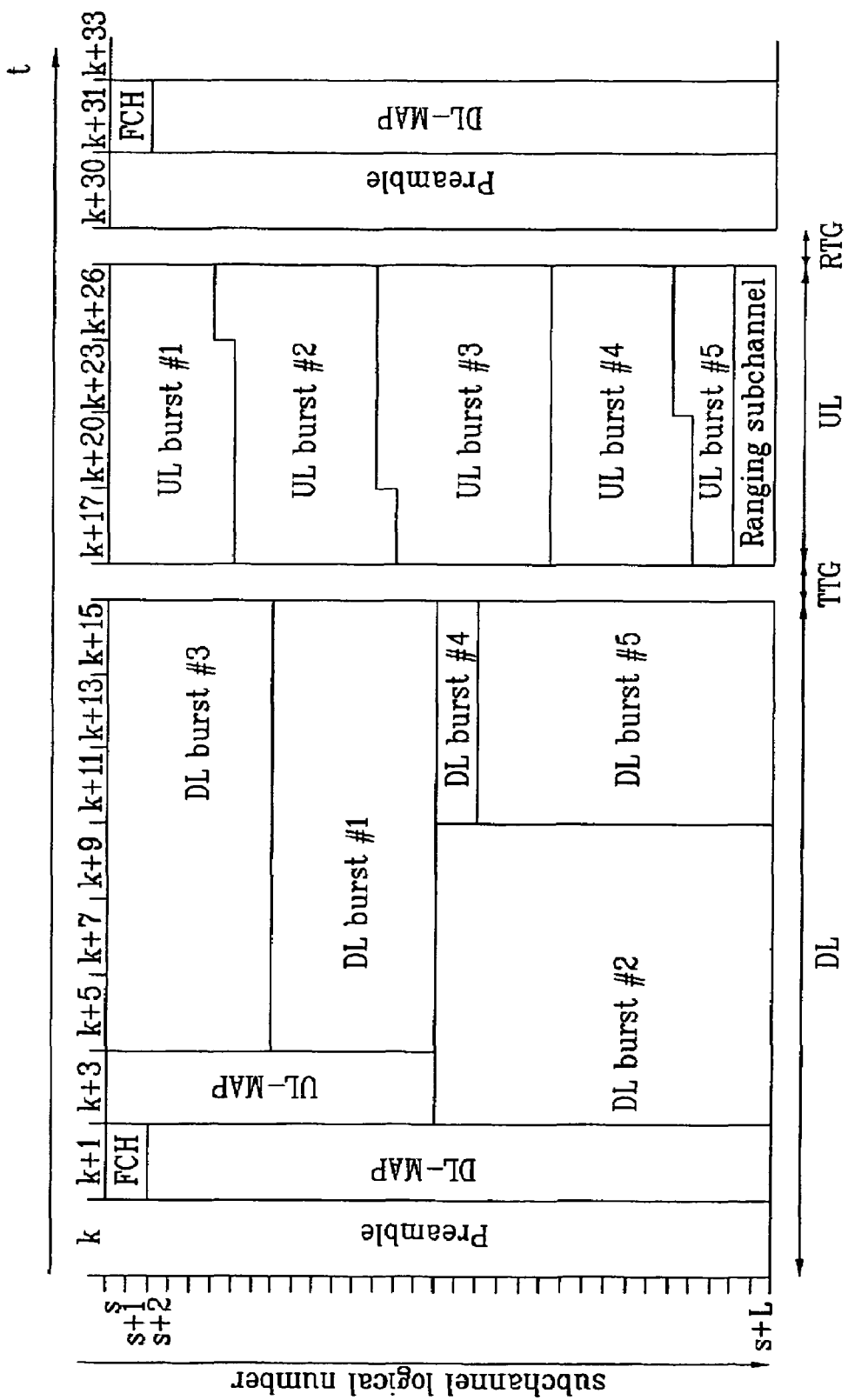
FIG. 1 is a diagram of a frame structure of an orthogonal frequency division multiple access (OFDMA) physical layer in a broadband wireless access system.
Figure 2:
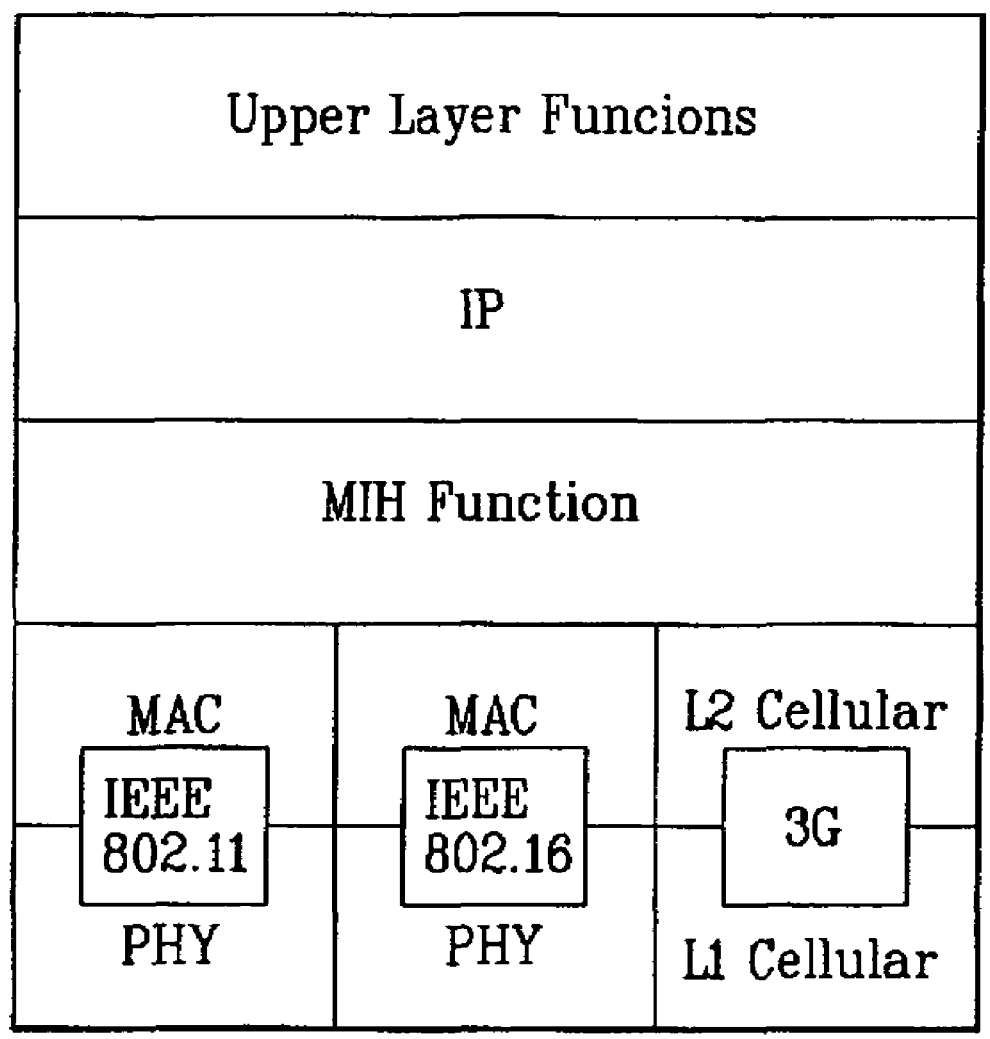
FIG. 2 is a diagram of a protocol stack structure of a multi-mode mobile subscriber station.
Figure 3:
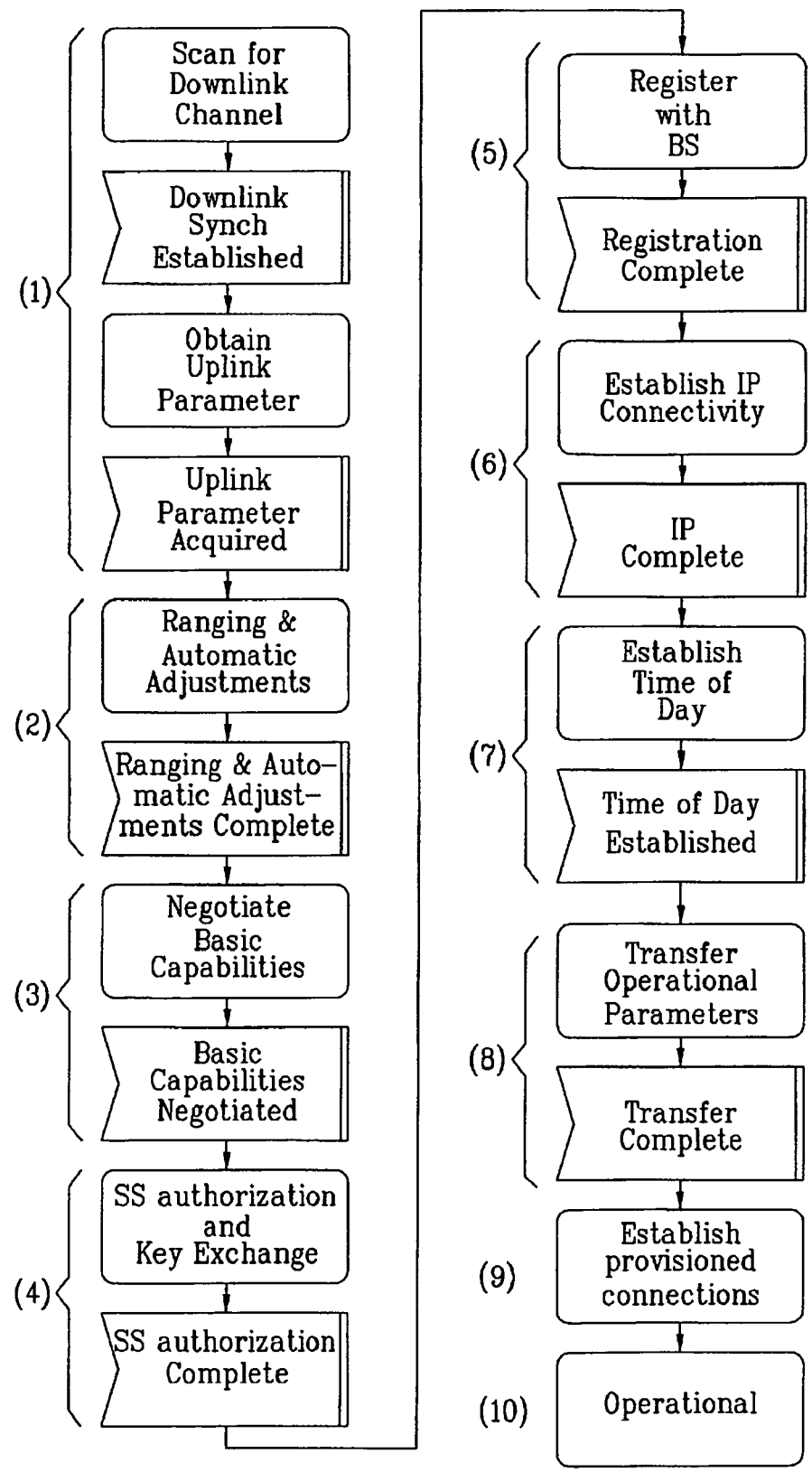
FIG. 3 is a flowchart of a network registration procedure in initializing a broadband wireless access system.
Figure 4:
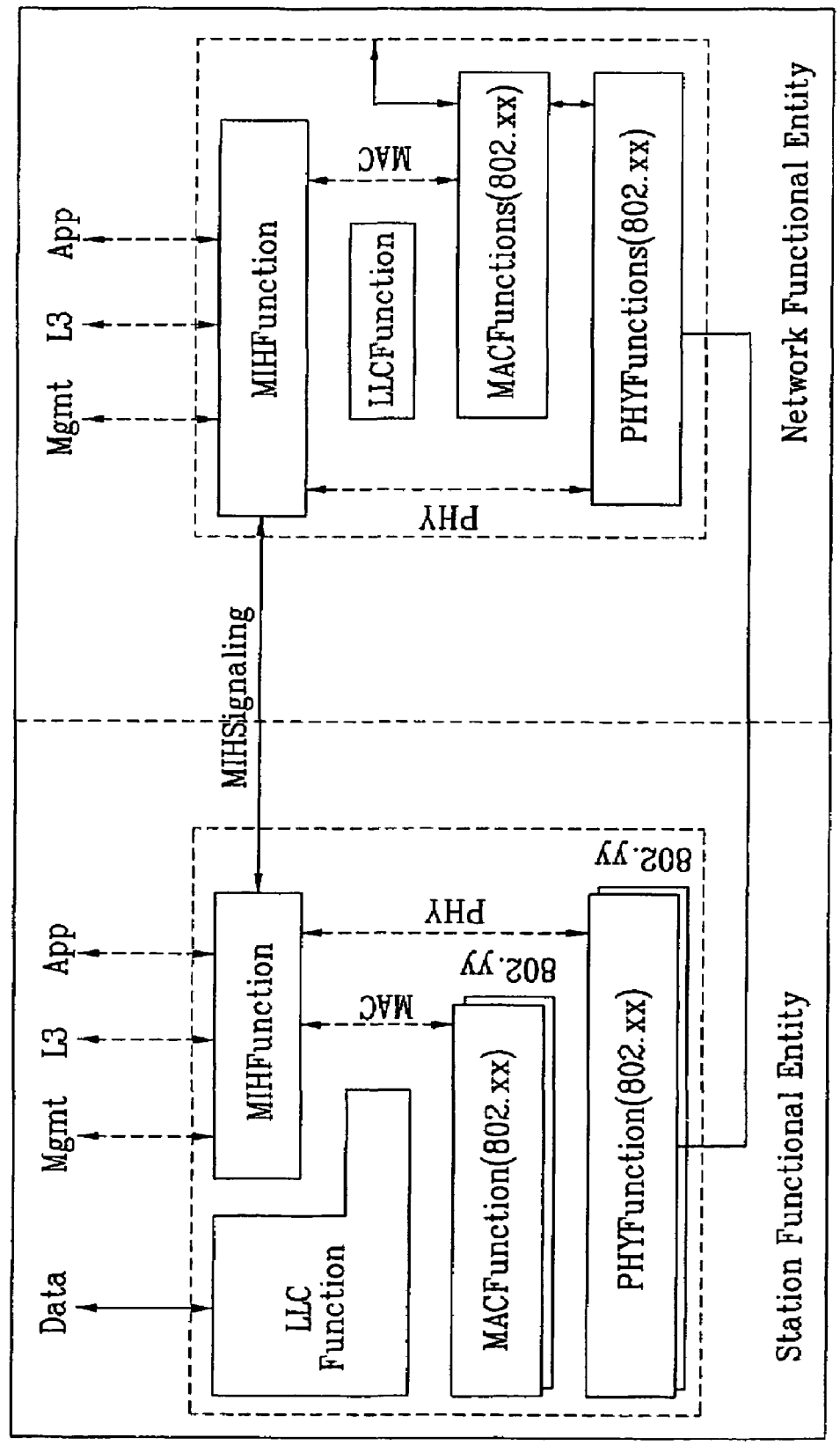
FIG. 4 is a diagram of functional entities and a transport protocol of a mobile terminal including an MIH function and a network.
Figure 5:
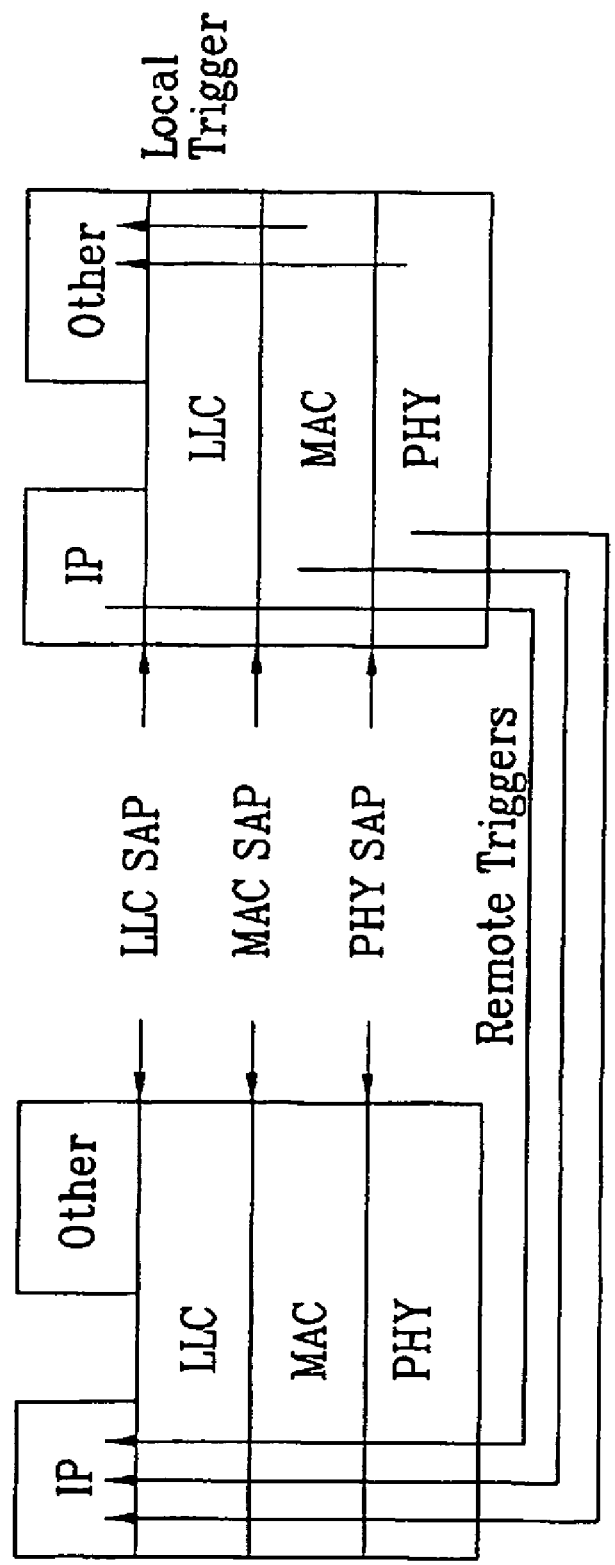
FIG. 5 is a diagram of a trigger model.
Figure 6:
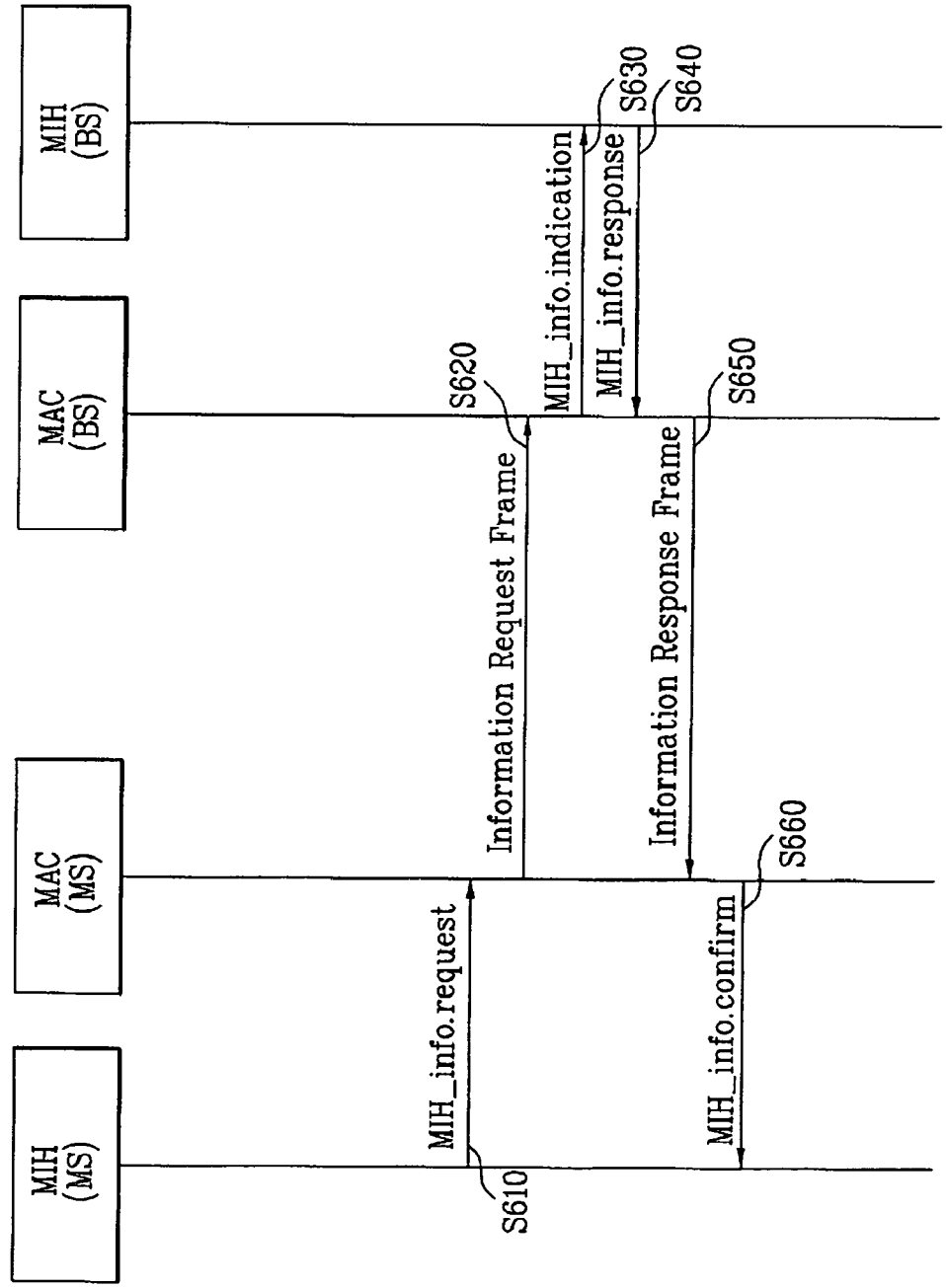
FIG. 6 is a flowchart of a procedure for acquiring an information service according to a related art.

The present invention relates to supporting a handover of a mobile terminal. Reference will now be made in detail to the preferred embodiments of the present invention, examples of which are illustrated in the accompanying drawings. Wherever possible, the same reference numbers will be used throughout the drawings to refer to the same or like parts.

The present invention relates to a method of acquiring information about MIH capability between a multi-mode mobile subscriber station (MSS) and a base station (BS) in a system where at least one of a broadband wireless access network, a wired local area network (LAN), a wireless LAN, and a cellular network is operated. No limitation is put on a type of the LAN or cellular network. For example, the wired LAN network can employ systems base on an IEEE 802.X system, the wireless LAN network can employ systems based on an IEEE 802.XX system, and the cellular network can employ systems defined by a standardization organization such as 3GPP and 3GPP2.

A currently accessed base station transmits MIH Capability information to a multi-mode mobile subscriber station so that the multi-mode mobile subscriber station can acquire MIH Capability information of a target base station belonging to a heterogeneous network the multi-mode mobile subscriber station attempts to access. There are various kinds of methods for transmitting MIH Capability information. Therefore, in accordance with the preferred embodiments of the present invention, different methods of transmitting MIH Capability information will be explained in the following description.

In accordance with a first embodiment of the present invention, a base station transmits a neighbor base station advertisement message (MOB-NBR-ADV) including MIH Capability information.

In accordance with a second embodiment of the present invention, a base station includes MIH Capability information in a frame check header (FCH) to be transmitted. In accordance with a third embodiment of the present invention, a base station includes MIH Capability information in an information element of a DL-MAP to be transmitted.

In accordance with a fourth embodiment of the present invention, MIH Capability information is included in a basic capability request/basic capability response (SBC-REQ/SBC-RSP) message communicated when a multi-mode mobile subscriber station negotiates with a base station for basic capability information. In one aspect of the invention, the multi-mode mobile subscriber station and the base station negotiate with each other for mutual MIH Capability.

In accordance with a fifth embodiment of the present invention, MIH Capability information is included in a registration request/registration response (MOB-REG-REQ/MOB-REG-RSP) message communicated when a multi-mode mobile subscriber station executes a registration procedure to a base station. In one aspect of the invention, the multi-mode mobile subscriber station and the base station negotiate with each other for mutual MIH Capability.

In accordance with a sixth embodiment of the present invention, a mobile subscriber station acquires MIH Capability information via a beacon message from a base station.

A base station may not only provide MIH Capability information about neighboring broadband wireless access system base stations to currently accessed mobile subscriber stations, but may also provide MIH Capability information about wireless LAN access points (APs) or points of attachment (POAs) capable of signal reception and cellular base stations. This may be done via a neighbor base station advertisement (MOB-NBR-ADV) broadcast message. Preferably, this message may include an Information Service (IS) Support field indicating whether a corresponding base station and APs or POAs can provide an information service acquired from an information service (IS) server to a mobile subscriber station. Table 16 shows an example of a format that is appended to an MOB-NBR-ADV message to represent MIH Capability information about a neighbor base station and a wireless LAN POA or cellular system base station.

An MIH INFO bitmap newly appended to a previous MOB-NBR-ADV message represents MIH Capability and IS Support about an available wireless LAN POA or a cellular system base station neighboring a broadband wireless access network base station a mobile subscriber station is accessing. An MIH INFO bitmap 2 indicates a presence or non-presence of MIH Capability and IS Support for a heterogeneous point of attachment located in the vicinity of neighboring broadband wireless access base stations, i.e., a wireless LAN POA or cellular system base station. Preferably, the MIH INFO bitmap 2 may indicate information about a presence or non-presence of MIH Capability and IS Support for a heterogeneous point of attachment located in the vicinity of a homogeneous neighbor base station as well as neighbor heterogeneous point of attachment information of a current base station.

A bit to include MIH Capability information of a current base station is added, by which a mobile subscriber station newly entering a current base station area can acquire information indicating whether MIH Capability and an IS function of a current or neighbor base station can be provided in a manner of receiving a downlink channel descriptor (DCD) message. The mobile subscriber station uses the information to acquire a burst file for decoding a broadcast message, obtain an originating location of the MOB_NBR-ADV message from the DL-MAP and decode the MOB_NBR-ADV message as a broadcast message received from the corresponding location. An MIH Unknown bit is added to the MIH INFO bitmap 1 or 2 for indicating a base station of which the presence or non-presence of MIH Enabled or MIH Disabled is unknown, i.e., base stations of which Capability is not confirmed. For example, if a wireless LAN POA available for MIH INFO bitmap 1 is discovered and bitmap information such as [1] Available WLAN POA, [0] Available POA MIH Enabled and [1] Available WLAN POA MIH Unknown is received, the status of the MIH Capability is unknown although a wireless POA enabling handover exists in the vicinity of a current base station. Hence, a meaning of the MIH Enabled bit is not related.

TABLE 16

| Syntax | Size | Notes |
|---|---|---|
| MOB_NBR-ADV_Message_Format( ) { | | |
| Management Message Type = 53 | 8 bits | |
| Skip-Optional-Fields bitmap | 8 bits | Bit [0]: if set to 1, omit Operator ID field |
| | | Bit [1]: if set to 1, omit MIH INFO bitmap |
| | | Bit [2]: if set to 1, omit NBR BS ID field |
| | | Bit [3]: if set to 1, omit HO process optimization field |
| | | Bit [4]: if set to 1, omit QoS related fields |
| | | Bit [5]: if set to 1, omit Current BS INFO |
| | | Bit [6]: if set to 1, omit MIH INFO bitmap2 |
| | | Bits [7]-[8]: reserved |

TABLE 16-continued

| Syntax | Size | Notes |
| --- | --- | --- |
| If (Skip-Optional-Fields-[0]=0) { | | |
| Operator ID | 24 bits | Unique ID assigned to the operator |
| } | | |
| Configuration Change Count | 8 bits | Incremented each time the information for the associated neighbor BS has changed. |
| Fragmentation Index | 4 bits | This field indicates the current fragmentation index. |
| Total Fragmentation | 4 bits | This field indicates the total number of fragmentations. |
| If (Skip-Optional-Fields-[1]=0) { | | |
| MIH INFO bitmap 1 | 16 bits | [0] Available WLAN POA<br>[1] Available WLAN POA MIH Enabled<br>[2] Available WLAN POA MIH Unknown<br>[3] Available WLAN POA IS Support<br>[4] Available 3GPP BS<br>[5] Available 3GPP BS MIH Enabled<br>[6] Available 3GPP BS MIH Unknown<br>[7] Available 3GPP BS IS Support<br>[8] Available 3GPP2 BS<br>[9] Available 3GPP2 BS MIH Enabled<br>[10] Available 3GPP2 BS MIH Unknown<br>[11] Available 3GPP2 BS IS Support<br>[12]-[15] reserved |
| } | | |
| If (Skip-Optional-Fields-[5]=0) { | | |
| Current BS MIH INFO | 1 bit | [0]: MIH not Supported<br>[1]: MIH Supported |
| Event Service Supported | 1 bit | 0: ES Not Supported<br>1: ES Supported |
| Command Service Supported | 1 bit | 0: CS Not Supported<br>1: CS Supported |
| IS Supported | 1 bit | 0: IS Not Supported<br>1: IS Supported |
| } | | |
| N_NEIGHBORS | 8 bits | |
| For (j=0 ; j<N_NEIGHBORS ; j++) { | | |
| If (Skip-Optional-Fields-[5]=0) { | | |
| MIH INFO bitmap 2 | 16 bits | [0] Available WLAN POA<br>[1] Available WLAN POA MIH Enabled<br>[2] Available WLAN POA MIH Unknown<br>[3] Available WLAN POA IS Support<br>[4] Available 3GPP BS<br>[5] Available 3GPP BS MIH Enabled<br>[6] Available 3GPP BS MIH Unknown<br>[7] Available 3GPP BS IS Support<br>[8] Available 3GPP2 BS<br>[9] Available 3GPP2 BS MIH Enabled<br>[10] Available 3GPP2 BS MIH Unknown<br>[11] Available 3GPP2 BS IS Support<br>[12]-[15] reserved |
| } | | |
| Length | 8 bits | Length of message information within the iteration of N_NEIGHBOR in bytes. |
| PHY Profile ID | 8 bits | Aggregated IDs of Co-located FA Indicator, FA Configuration Indicator, FFT size, Bandwidth, Operation Mode of the starting sub-channelization of a frame and Channel Number |
| if (FA Index Indicator == 1) { | | |
| FA Index | 8 bits | This field, Frequency Assignment Index, is present only the FA Index Indicator in PHY Profile ID is set.<br>Otherwise, the neighbor BS has the same FA Index or the center frequency is indicated using the TLV encoded information. |
| } | | |
| if (BS EIRP Indicator == 1) { | | |
| BS EIRP | 8 bits | Signed Integer from −128 to 127 in unit of dBm. This field is present only if the BS EIRP indicator is set in PHY Profile ID. Otherwise, the BS has the same EIRP as the serving BS. |
| } | | |
| if (Skip-Optional-Fields[2]=0) { | | |
| Neighbor BSID | 24 bits | This is an optional field for OFDMA PHY and it is omitted or skipped if Skip Optional Fields Flag = 1. |

TABLE 16-continued

| Syntax | Size | Notes |
|---|---|---|
| } | | |
| MIH Capability | 1 bit | This is indication for MIH Capability<br>0: MIH Not Supported<br>1: MIH Supported |
| Event Service Supported | 1 bit | 0: Event Service is Not Supported<br>1: Event Service is Supported |
| Command Service Supported | 1 bit | 0: Command Service is Not Supported<br>1: Command Service is Supported |
| IS Supported | | This is indication for Information Service support<br>0: Media Independent Information Service is Not Supported<br>1: Media Independent Information Service is Supported |
| Preamble Index/Subchannel Index | 8 bits | The index for the PHY profile specific preamble. Preamble Index is PHY specific for SCa and OFDMA. The value of Preamble Index shall be ignored and a value of 0x00? 0 shall be used for OFDM PHY. For the SCa and OFDMA PHY this parameter defines the PHY specific preamble. For the OFDM PHY the 5 LSB contain the active DL subchannel index. The 3 MSB shall be reserved and set to 0b000. |
| if (Skip-Optional-Fields[3]=0) { | | |
| HO Process Optimization | 8 bits | HO Process Optimization is provided as part of this message is indicative only. HO process requirements may change at time of actual HO.<br>For each Bit location, a value of 0 indicates the associated reentry management messages shall be required, a value of 1 indicates the reentry management message may be omitted.<br>Regardless of the HO Process Optimization TLV settings, the target BS may send unsolicited SBC-RSP and/or REG-RSP management messages.<br>Bit #0: Omit SBC-REQ/RSP management messages during current reentry processing<br>Bit #1: Omit PKM-REQ/RSP management messages during current reentry processing<br>Bit #2: Omit REG-REQ/RSP management messages during current reentry processing<br>Bit #3: Omit Network Address Acquisition management messages during current reentry processing<br>Bit #4: Omit Time of Day Acquisition management messages during current reentry processing<br>Bit #5: Omit TFTP management messages during current reentry processing<br>Bit #6: Full service and operational state transfer or sharing between serving BS and target BS (ARQ, timers, counters, MAC state machines, etc.<br>Bit #7: Reserved |
| }<br>if (Skip-Optional-Fields-[4]=0) { | | |
| Scheduling Service Supported | 4 bits | Bitmap to indicate if BS supports a particular scheduling service, 1 indicates support, 0 indicates not support<br>bit 0: Unsolicited Grant Service (UGS)<br>bit 1: Real-time Polling Service (rtPS)<br>bit 2: Non-real-time Polling service (nrtPS)<br>bit 3: Best Effort value of 0000 indicates no information on service available |
| Available Radio Resource | 4 bits | Percentage of reported average available subchannels and symbols resources per frame<br>0000: 0%<br>0001: 20%<br>0010: 40%<br>0011: 60%<br>0100: 80%<br>0101: 100%<br>0110-1110: reserved<br>0110-1110: reserved value of 1111 indicates no information on service available |
| Reserved | 8 bits | Shall be set to zero |
| } | | |
| DCD Configuration Change Count | 4 bits | This represents the 4 LS bits of the Neighbor BS current DCD configuration change count |
| UCD Configuration Change Count | 4 bits | This represents the 4 LS bits of the Neighbor BS current UCD configuration change count |
| TLV Encoded Neighbor information | variable | TLV specific |
| } | | |
| } | | |

A base station may inform a mobile subscriber station of availability of its MIH Capability by including the information in a frame check header (FCH). Accordingly, the mobile subscriber station may acquire the MIH Capability information about the corresponding base station from an MIH Capability information element after receiving the FCH to decode a downlink frame of the base station. Moreover, the mobile subscriber station may acquire information related to whether the base station can provide an information service acquired from an information service (IS) server to the mobile subscriber station from an IS Supported information element. Table 17 shows an example of an available format, in which "MIH Capability" and "IS Supported" information elements are appended to an FCH message. Through this format, a base station can inform a mobile subscriber station whether an MIH function and an information service can be supported to the mobile subscriber station.

tion having received the DL-MAP message for synchronization with the base station may acquire the MIH Capability information about the corresponding base station. Preferably, the base station acquires an information service from an IS server and may include an Information Service Support field, which indicates whether the information service can be provided to the mobile subscriber station, in the DL-MAP message. Table 18 shows an example of a format that may represent MIH Capability information added to one Information Element (IE) included in a DL-MAP message. An MIH_Capability_IE notifies the MIH capability of the network. The MIH capability indicates that the MIH function messages can be exchanged with the BS by using the MAC management messages in order for the MS to access the services of the MIH function of the network. Furthermore, the MIH_Capability_IE notifies the types of MIH services supported by the MIH function of the network through the current BS. The capability to provide the MIH function of the

TABLE 17

| Syntax | Size | Notes |
| --- | --- | --- |
| DL_Frame_Prefix_Format( ) { | | |
| Used subchannel bitmap | 6 bits | Bit #0: Subchannels 0-11 are used |
| | | Bit #1: Subchannels 12-19 are used |
| | | Bit #2: Subchannels 20-31 are used |
| | | Bit #3: Subchannels 32-39 are used |
| | | Bit #4: Subchannels 40-51 are used |
| | | Bit #5: Subchannels 52-59 are used |
| Ranging_Change_Indication | 1 bit | |
| Repetition_Coding_Indication | 2 bits | 00 - No repetition coding on DL-MAP |
| | | 01 - Repetition coding of 2 used on DL-MAP |
| | | 10 - Repetition coding of 4 used on DL-MAP |
| | | 11 - Repetition coding of 6 used on DL-MAP |
| Coding_Indication | 3 bits | 0b000 - CC encoding used on DL-MAP |
| | | 0b001 - BCC encoding used on DL-MAP |
| | | 0b010 - CTC encoding used on DL-MAP |
| | | 0b011 - ZT CC used on DL-MAP |
| | | 0b100 to 0b111 - Reserved |
| DL_MAP_Length | 8 bits | |
| MIH Capability | 1 bit | 0: MIH Not Supported |
| | | 1: MIH Supported |
| Event Service Supported | 1 bit | 0: Media Independent Event Service is Not Supported |
| | | 1: Media Independent Event Service is Supported |
| Command Service Supported | 1 bit | 0: Media Independent Command Service is Not Supported |
| | | 1: Media Independent Command Service is Supported |
| IS Supported | 1 bit | 0: IS Not Supported |
| | | 1: IS Supported |
| reserved | 2 bits | Shall be set to zero |
| } | | |

A base station may include availability of its MIH Capability within a DL-MAP message and inform a mobile subscriber station of the availability. The mobile subscriber stanetwork refers to the BS being able to directly use the services of the MIH function, and the BS being able to access the MIH function entity via the NCMS.

TABLE 18

| Syntax | Size | Notes |
| --- | --- | --- |
| MIH_Capability_IE( ) | | |
| { | | |
| Extended DIUC | 4 bits | MIH_Capability_IE = XX |
| Length | 4 bits | Length = 0x01 |
| MIH Capability | 1 bit | 0: MIH Not Supported |
| | | 1: MIH Supported |
| Event Service Supported | 1 bit | 0: Media Independent Event Service is Not Supported |
| | | 1: Media Independent Event Service is Supported |
| Command Service Supported | 1 bit | 0: Media Independent Command Service is Not Supported |
| | | 1: Media Independent Command Service is Supported |

TABLE 18-continued

| Syntax | Size | Notes |
|---|---|---|
| Information Service Support | 1 bit | This field indicates whether a corresponding base station can provide an information service from an IS server.<br>0: IS Not Supported<br>1: IS Supported |
| Information Service ID | 8 bits | |

Parameters are used to notify whether the current BS can access the MIH function services via the NCMS. This applies to a situation where the current BS has the capabilities of the MIH function. If the parameter is set to "1," the MS can access the MIH function via the current BS and can use the MAC management messages associated with the MIH (e.g., MOB_MSMIH-REQ, MOB_MSMIH-RSP, MOB_BSMIH-REQ, MOB_BSMIH-RSP) to communicate with the MIH function. An Event Service Supported parameter is a parameter used to notify whether the MIH function, which can be accessed using the BS, supports an Event Service (ES). A Command Service Supported parameter is a parameter used to notify whether the MIH function, which can be accessed using the BS, supports a Command Service (CS). An Information Service Supported parameter is a parameter used to notify whether the MIH function, which can be accessed using the BS, supports an Information Service (IS).

TLV (type, length and value) is used for negotiating with a base station for functions associated with Media Independent Handover. In case that a mobile subscriber station including an MIH layer performs an MIH function, the mobile subscriber station sets a corresponding bit to transmit to a base station. If the base station including an MIH layer is able to support this function, the base station sets the bit in a response message to be transmitted.

With regard to an information service, when attempting to receive the information service via a base station, a mobile subscriber station sets a corresponding bit to make a request. If the base station is able to provide the information service to the mobile subscriber station by communicating with an information service server or by acting as the information service server, the base station responds by setting the bit to enable negotiation between the mobile subscriber station and the base station.

Table 19 illustrates the MIH Capability information in a TLV format in the SBC-RSP message or the REG-RSP message according to an embodiment of the present invention. As illustrated in Table 19, if the MS sets the corresponding bit to "1" and sends a request based on the setting, this indicates that the corresponding capability is supported by the MIH of the MS. If the BS sets the corresponding bit to "1" and sends a response accordingly, this indicates that the corresponding capability is supported by the MIH function of the network which encompasses the BS. Alternatively, a bit setting of "0" indicates that the capability is not supported.

Preferably, Bit #0 indicates whether the MIH is supported by the MS or the BS. Moreover, Bit #1 indicates whether the ES is supported, Bit #2 indicates whether the CS is supported, and Bit #3 indicates whether IS is supported. In detail, Bit #3 inquires as to whether the BS has the capability to receive the IS from the IS Server or whether the BS can perform the capabilities of the IS Server.

In addition, a different indication of Bit #0 is that if this indicator is set and transmitted by the BS, the BS can access the MIH function via the NCMS or the services of the MIH function can be provided by the BS. Furthermore, if the value of the indicator is set and transmitted to the MS, this indicates that the MAC management message associated with the MIH (e.g., MOB_MSMIH-REQ, MOB_MSMIH-RSP, MOB_BSMIH-REQ, MOB_BSMIH-RSP) can be used.

TABLE 19

| Type | Length | Value | Scope |
|---|---|---|---|
| MIH Capability | 1 | Bit #0: Media Independent Handover Support (MIH Capability) | REG-REQ |
| | | Bit #1: Event Service Supported | REG-RSP |
| | | Bit #2: Command Service Supported | SBC-REQ |
| | | Bit #3: Information Service Supported | SBC-RSP |
| | | Bit #4~7: Reserved | |

Table 20 and Table 21 show other formats capable of including MIH Capability, respectively. When executing a network reentry procedure to a target base station by attempting handover or after having completed a ranging procedure with a target base station to which an initial network entry procedure is executed, a mobile subscriber station may include its MIH Capability information in an SBC-REQ message to be transmitted when negotiating with the base station for basic capability and then transmitting the message to the base station. Table 21 shows an example of an MIH Capability field that can be included in an SBC-REQ message in a TLV format. If MIH Capability is available, a target base station transmits an SBC-RSP message by setting an MIH Capability bit to 1. In this case, the MIH Capability bit is included in the TLV of the SBC-RSP message in a format shown in Table 20.

A mobile subscriber station may include its MIH Capability information in a MOB-REG-REQ message to be transmitted for executing a registration procedure and then transmit the message to a base station. Table 20 shows an example of an MIH Capability field that may be included in an REG-REQ message in a TLV format. If MIH Capability is available, a target base station transmits an REG-RSP message by setting an MIH Capability bit to 1. In this case, the MIH capability bit is included in the TLV of the REG-RSP message in a format shown in Table 20.

TABLE 20

| Syntax | Size | Notes |
|---|---|---|
| MIH Capability | 1 bit | 0: MIH Not Supported<br>1: MIH Supported |
| Information Service Support | 1 bit | This field indicates whether a corresponding base station can provide an information service from an IS server.<br>0: IS Not Supported<br>1: IS Supported |

TABLE 21

| Syntax | Size | Notes |
| --- | --- | --- |
| MIH Capability | 1 bit | 0: MIH Not Supported<br>1: MIH Supported |

In performing a scan, a MAC layer of a mobile subscriber station receives a beacon message including MIH Capability information from a base station. Accordingly, the MAC layer of the mobile subscriber station includes this information in a Link_Available trigger and informs an MIH of the information.

Table 22 shows one embodiment for including MIH Capability information in a Link_Available trigger.

TABLE 22

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| IP_Renewal_Indicator | | Indicating necessity of changing temporary IP address.<br>0: change unnecessary<br>1: change necessary |
| MIH Capability | | 0: MIH Not Supported<br>1: MIH Supported |
| Event Service Supported | 1 bit | 0: Media Independent Event Service is Not Supported<br>1: Media Independent Event Service is Supported |
| Command Service Supported | 1 bit | 0: Media Independent Command Service is Not Supported<br>1: Media Independent Command Service is Supported |
| IS Support | | This field indicates whether a corresponding base station can provide an information service from an IS server.<br>0: IS Not Supported<br>1: IS Supported |

After receiving the DL-MAP including MIH Capability information from a base station, a MAC layer of a mobile subscriber station delivers the MIH Capability information of the base station to its MIH via an "MIH_Capability.indication" primitive. One embodiment of the "MIH_Capability.indication" primitive will now be explained.

First, functions of the "MIH_Capability.indication" primitive will be explained. A MAC layer of a mobile subscriber station delivers MIH Capability information of a target base station to its MIH via this primitive. The primitive is then delivered to an upper management entity from the MIH to deliver MIH_Capability information of a neighbor base station to the upper management entity. The upper management entity may be used to decide whether handover to a network supporting MIH is to be performed. Moreover, the primitive can be directly delivered to the upper management entity by the MAC layer. The upper management entity may use this information in deciding to perform handover with reference to a possibility of the network supporting MIH.

Semantics of the "MIH_Capability.indication" primitive is represented as follows.

```
MIH_Capability.indication {
    Source;
    Destination;
    LinkIdentifier;
    BS MIH Capability;
    BS Event Service Supported;
    BS Command Service Supported;
    BS IS Support
}
```

TABLE 23

| Name | Type | Description |
| --- | --- | --- |
| Source | Event_Source | |
| Destination | Event_Destination | |
| LinkIdentifier | Network Identifier | can be one of different 802 and cellular networks |
| BS MIH Capability | Flag | 0: MIH Capability Not Supported<br>1: MIH Capability Supported |
| BS Event Service Supported | Flag | 0: Media Independent Event Service is Not Supported<br>1: Media Independent Event Service is Supported |
| BS Command Service Supported | Flag | 0: Media Independent Command Service is Not Supported<br>1: Media Independent Command Service is Supported |
| BS IS Support | Flag | 0: IS Not Supported<br>1: IS Supported |

In case of a broadband wireless access system, "BS MIH Capability" and "BS IS Support" parameters represent MIH Capability of a new base station and the possibility of IS support, respectively. According to each heterogeneous media, "BS MIH Capability" and "BS IS Support" parameters represent MIH Capability and the possibility of IS Support of a POA of a wireless LAN (IEEE 802.11) system, a Node B of a 3GPP system, or a base station (BTS) of 3GPP2 system.

A time for generating the "MIH_Capability.indication" primitive is explained as follows. If a MAC layer of a mobile subscriber station receives a beacon, DL-MAP or Neighbor Advertisement message containing MIH Capability information of a point of attachment, the "MIH_Capability.indication" primitive is generated to deliver the information to the MIH or upper management entity. If the MIH discovers that a new network (e.g. IEEE 802.16, IEEE 802.11, 3GPP, or 3GPP2) has an MIH function or that the new network supports an information service (IS), the "MIH_Capability.indication" primitive is generated to inform an upper management entity of the discovered information.

An effect of receiving the "MIH_Capability.indication" primitive is explained as follows. After receiving the primitive, the MIH or upper management entity acquires the MIH Capability information of the target base station.

In accordance with the preferred embodiments of the present invention, methods for providing MIH Capability of a base station to a multi-mode mobile subscriber station in a broadband wireless access system will now be explained. In the following embodiments, handover to an IEEE 802.16 system from an IEEE 802.11 system is described. However, as mentioned in the foregoing description, the present invention is applicable to a system operating in at least one of a broadband wireless access network, a wireless LAN, and a cellular network. Therefore, handover to various kinds of wireless LANs, cellular networks or other broadband wireless access networks is enabled.

A method according to one embodiment of the present invention is explained as follows. First, a base station initially includes MIH Capability and IS (Information Service) Support information within an Information Element (IE) of a DL-MAP and then transmits the DL-MAP. In the method according to this embodiment of the present invention, handover from a wireless LAN is explained. Preferably, the wireless LAN operates in an IEEE 802.11 system.

Figure 7:
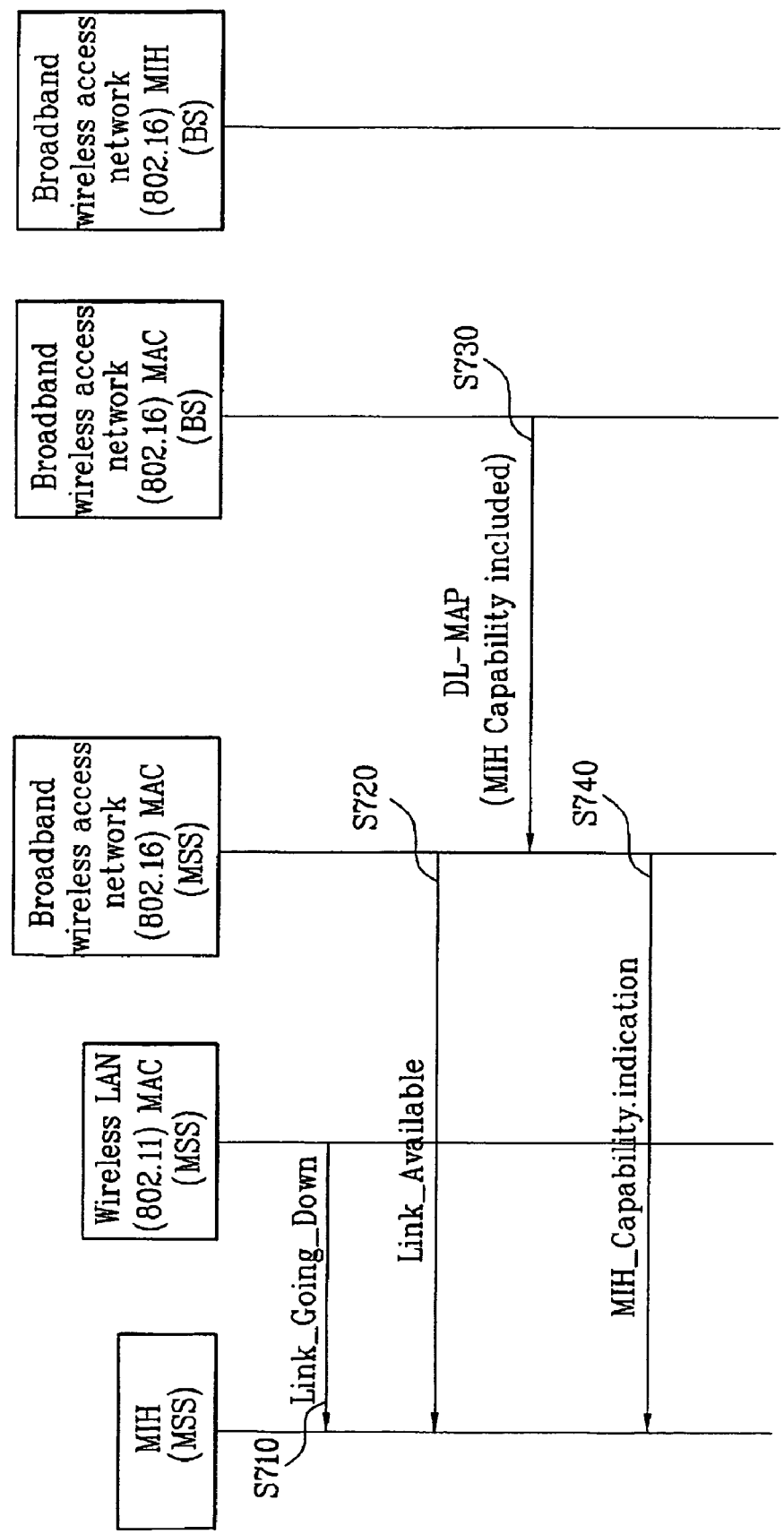
FIG. 7 is a flowchart of a method for transmitting a DL-MAP message including MIH Capability from a base station in accordance with one embodiment of the present invention.

FIG. 7 shows an example of a base station transmitting a DL-MAP by including MIH Capability information and IS Support information in the DL-MAP when a multi-mode mobile subscriber station currently operating in an IEEE 802.11 system attempts handover to an IEEE 802.16 system and receives the DL-MAP for MAC synchronization.

Referring to FIG. 7, an IEEE 802.11 MAC of a multi-mode mobile subscriber station (MSS) measures a quality of a currently connected link by periodic or requested scanning. If the quality of the currently connected link is degraded, a "Link_Going_Down" trigger is transmitted to the MIH of the MSS (S710). After searching for a new link, an IEEE 802.16 MAC of the MSS transmits a "Link_Available" trigger to the MIH of the MSS (S720). The 802.16 MAC of the MSS then receives and decodes a DL-MAP, which is transmitted each frame. From the DL-MAP, the 802.16 MAC of the MSS acquires MIH Capability information and IS Support information of a target base station (S730). Subsequently, the 802.16 MAC of the MSS delivers the MIH Capability and IS Support information of the target base station to the MIH of the MSS via a "MIH_Capability.indication" primitive (S740).

In case that a multi-mode mobile subscriber station attempts handover from an IEEE 802.16 base station to another IEEE 802.16 base station, or that an initial network entry procedure is executed by powering a multi-mode mobile subscriber station within an IEEE 802.16 base station, MIH Capability and IS support information may be acquired via a DL-MAP according to the example of FIG. 7.

A method according to another embodiment of the present invention is explained as follows. Preferably, MIH Capability information and IS Support information are acquired via SBC-REQ and SBC-RSP messages when a mobile subscriber station negotiates with a base station for basic capability.

In this embodiment of the present invention, handover to a wireless LAN among cellular networks, broadband wireless access networks, and wireless LANs is described. Preferably, the wireless LAN is an IEEE 802.11 system.

Figure 8:
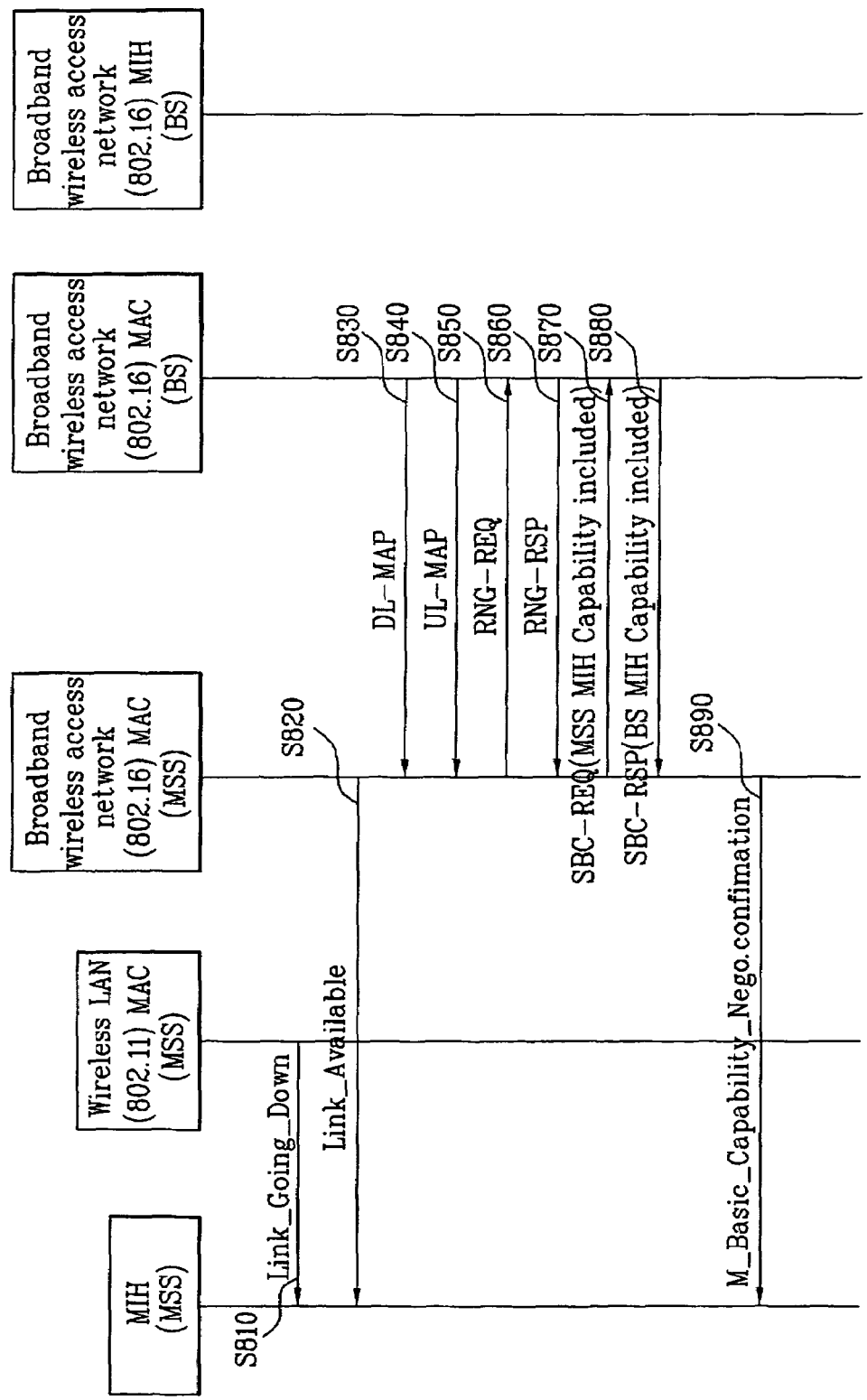
FIG. 8 is a flowchart of a procedure for acquiring MIH Capability information of a base station via basic capability negotiation request and response messages in accordance with one embodiment of the present invention.

FIG. 8 shows an example of a multi-mode mobile subscriber station currently operating in an IEEE 802.11 system acquiring MIH Capability information and IS Support information via SBC-REQ and SBC-RSP messages when attempting handover to an IEEE 802.16 system and negotiating with a base station for basic capability.

Referring to FIG. 8, if the quality of a link the mobile subscriber station (MSS) is currently connected to is degraded, an IEEE 802.11 MAC of the MSS transmits a "Link_Going_Down" trigger to the MIH of the MSS (S810). After searching for a new link, an IEEE 802.16 MAC of the MSS transmits a "Link_Available" trigger to the MIH of the MSS (S820). The MSS then receives a DL-MAP from a base station and executes MAC synchronization (S830). Afterward, the MSS receives a UL-MAP from the base station (S840). Thereafter, the MSS transmits an RNG-REQ message (S850) to the base station, and the base station sends an RNG-RSP message in response (S860).

After receiving the RNG_RSP message, the MSS includes its MIH Capability information in an SBC-REQ message to be transmitted for negotiating for basic capability and transmits the message to the base station (S870). In response, the base station includes its MIH Capability and IS Support information in an SBC-RSP message and sends the corresponding message to the MSS (S880). The MSS includes the MIH Capability information of the base station in an "M_Basic_Capability_Nego.confirmation" primitive and delivers it to the MIH of the MSS (S890). Therefore, the MIH of the multi-mode mobile subscriber station can recognize whether the base station supports an MIH function and an Information Service function. Notably, in the steps S830 to S880, a primitive transferred between the IEEE 802.16 MAC and the MIH of the mobile subscriber station, and another primitive transferred between the IEEE 802.16 MAC and the MIH of the base station are omitted.

In case that a multi-mode mobile subscriber station attempts handover from an IEEE 802.16 base station to another IEEE 802.16 base station, or that an initial network entry procedure is executed by powering a multi-mode mobile subscriber station within an IEEE 802.16 base station, MIH Capability and IS support information can be acquired via the SBC-REQ and SBC-RSP messages according to the embodiment shown in FIG. 8.

A method according to another embodiment of the present invention is explained as follows. Preferably, MIH Capability information and IS Support information are acquired via REG-REQ and REG-RSP messages when a mobile subscriber station executes a registration procedure to a base station.

In this embodiment of the present invention, handover to a wireless LAN among cellular networks, broadband wireless access networks and wireless LANs is described. Preferably, the wireless LAN network is an IEEE 802.11 system.

Figure 9:
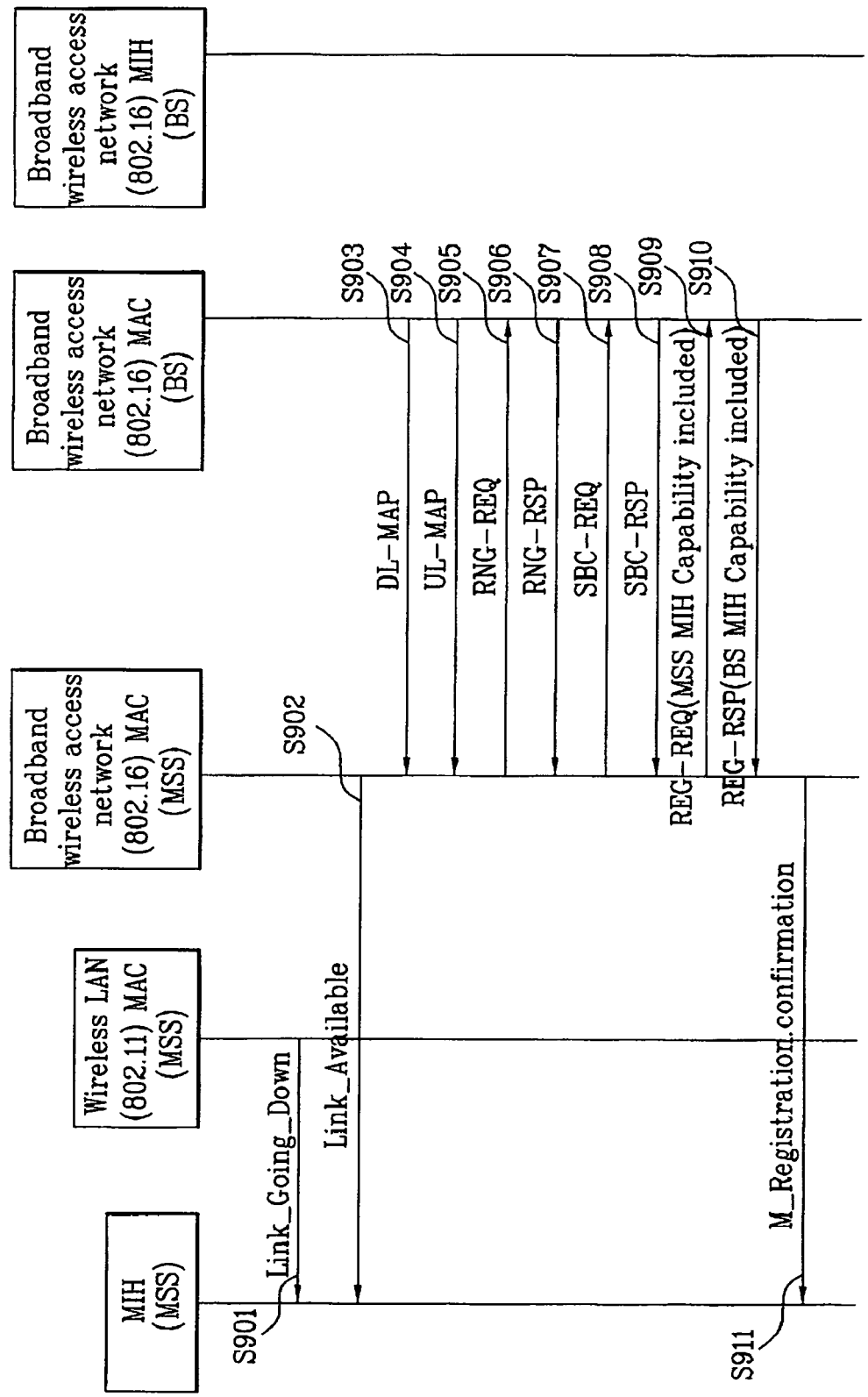
FIG. 9 is a flowchart of a procedure for acquiring MIH Capability information of a base station via registration request and response messages in accordance with one embodiment of the present invention.

FIG. 9 shows an example of a multi-mode mobile subscriber station currently operating in an IEEE 802.11 system acquiring MIH Capability information and IS Support information via REG-REQ and REG-RSP messages when attempting handover to an IEEE 802.16 system and executing a registration procedure to a base station.

Referring to FIG. 9, an IEEE 802.11 MAC of a multi-mode mobile subscriber station (MSS) measures a quality of a link the MSS is currently connected to by periodic or requested scanning. If the quality of the currently connected link is degraded, the IEEE 802.11 MAC of a MSS transmits a "Link_Going_Down" trigger to the MIH of the MSS (S901). After searching for a new link, an IEEE 802.16 MAC transmits a "Link_Available" trigger to the MIH of the MSS (S902). The MSS then receives a DL-MAP from a base station (BS) and executes MAC synchronization (S903). Afterward, the MSS receives a UL-MAP from the base station (S904). Thereafter, the MSS transmits an RNG-REQ message (S905) to the base station, and the base station sends an RNG-RSP message in response (S906).

The MSS then sends an SBC-REQ message to the base station to negotiate for basic capability (S907) and the base station sends an SBC-RSP message in response (S908). After receiving the SBC-RSP message from the base station, the mobile subscriber station includes its MIH Capability information in an REG-REQ message to be transmitted for executing a registration procedure and transmits the message to the base station (S909). Accordingly, the base station includes its MIH Capability and IS Support information in an REG-RSP message and sends the message to the MSS in response (S910).

Having received the REG-RSP message from the base station, the mobile subscriber station delivers an "M_Registration.confirmation" primitive containing the MIH Capability information of the base station to its MIH (S911). Through this, the MIH of the multi-mode mobile subscriber station can recognize whether the base station supports an MIH and Information Service function. In the steps S903 to S910, a primitive transferred between the IEEE 802.16 MAC and MIH of the mobile subscriber station, and another primitive transferred between the IEEE 802.16 MAC and MIH of the base station, are omitted.

In case that a multi-mode mobile subscriber station attempts handover from an IEEE 802.16 base station to another IEEE 802.16 base station, or that an initial network entry procedure is executed by powering a multi-mode mobile subscriber station within the IEEE 802.16 base station, MIH Capability and IS support information can be acquired via the REG-REQ and REG-RSP messages according to the embodiment shown in FIG. 9.

A method according to another embodiment of the present invention is explained as follows. In this embodiment of the present invention, handover to a wireless LAN among cellular networks, broadband wireless access networks and wireless LANs is described. Preferably, the wireless LAN network is an IEEE 802.11 system. Preferably, a mobile subscriber station receives a broadcast message containing MIH Capability from a base station is.

Figure 10:
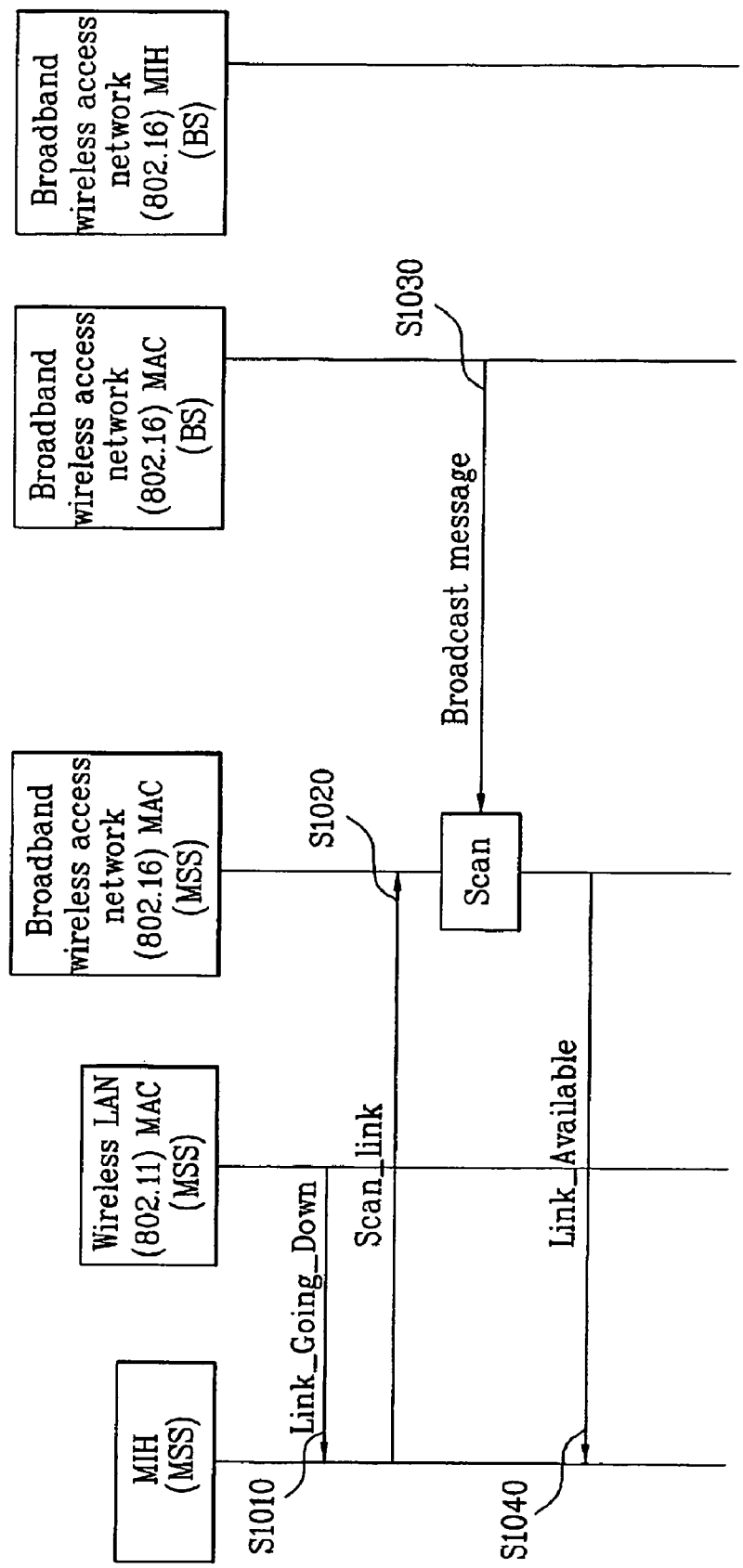
FIG. 10 is a flowchart of a procedure for acquiring MIH Capability information via a broadcast message of a base station in accordance with one embodiment of the present invention.

FIG. 10 shows an example of a multi-mode mobile subscriber station (MSS) currently operating in an IEEE 802.11 system acquiring MIH Capability information via a broadcast message from an IEEE 802.16 base station (BS). The MSS includes the information in a "Link_Available" trigger to be transmitted to the MIH of the MSS, and transmits the trigger when scanning another interface network because of signal degradation of a current link.

Referring to FIG. 10, an IEEE 802.11 MAC of a multi-mode mobile subscriber station measures a quality of a link the MSS is currently connected to by periodic or requested scanning. If the quality of the currently connected link is degraded, a "Link_Going_Down" trigger is transmitted to the MIH of the MSS (S1010). A higher management entity or MIH of the MSS then directs an IEEE 802.16 MAC of the MSS to perform a scan to search for a usable or available base station (S1020). The IEEE 802.16 MAC performing a scan process receives a broadcast message from an IEEE 802.16 base station (S1030). Thereafter, the IEEE 802.16 MAC transfers MIH capability information included in the broadcast message to the MIH of the MSS via a "Link_Available" trigger (S1040).

In case that a multi-mode mobile subscriber station attempts handover from an IEEE 802.16 base station to another IEEE 802.16 base station, or that an initial network entry procedure is executed by powering a multi-mode mobile subscriber station within the IEEE 802.16 base station, MIH Capability and IS support information can be acquired via the SBC-REQ and SBC-RSP messages according to the embodiment shown in FIG. 8.

A method according to another embodiment of the present invention is explained as follows. First, a base station includes its MIH Capability and information service (IS) Support information in a neighbor advertisement (MOB_NBR-ADV) message and transmits the message. A mobile subscriber station acquires the information and uses it to decide whether to execute handover.

Figure 11:
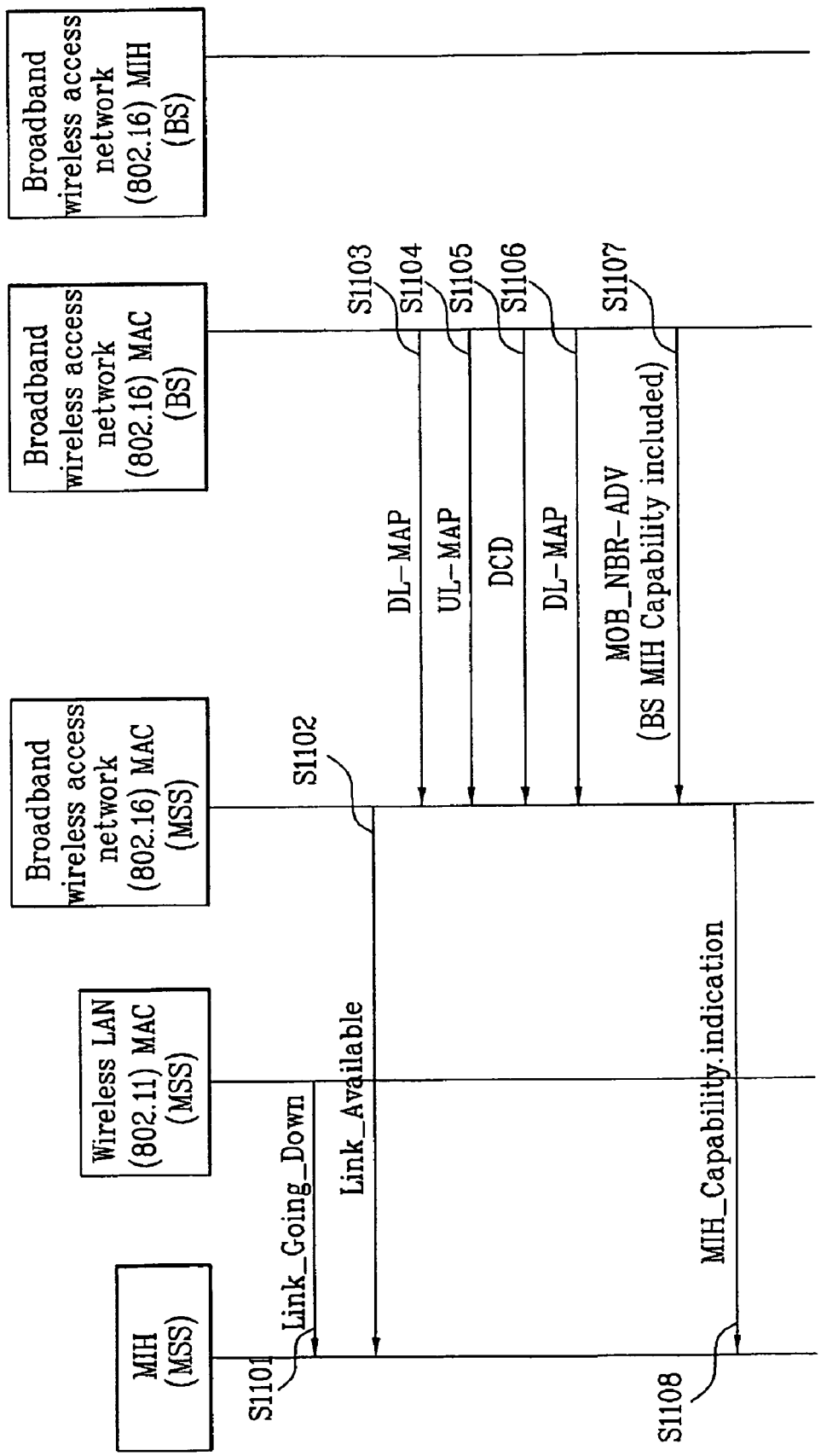
FIG. 11 is a flowchart of a procedure for acquiring MIH Capability information and information indicating whether an information service is supported via a neighbor advertisement (MOB_NBR-ADV) message in accordance with one embodiment of the present invention.

Referring to FIG. 11, a multi-mode mobile subscriber station (MSS) currently operating in an IEEE 802.11 system executes a scan process for other interface networks because a signal quality of a current link is degraded. In doing so, the multi-mode mobile subscriber station acquires MIH Capability information by receiving the Neighbor Advertisement (MOB_NBR-ADV) message transmitted from an IEEE 802.16 base station (BS). The MSS then delivers the MIH Capability information and IS Support information of a target base station to its MIH via an MIH_Capability.indication primitive. Preferably, this primitive can be delivered to an upper management entity. In case of acquiring the MIH Capability information from the scan process, the MIH Capability information acquired from the MOB_NBR-ADV message can be delivered to the MIH of the MSS via a Link_Available trigger.

An IEEE 802.11 MAC of a multi-mode mobile subscriber station measures a quality of a currently accessed link by periodic or requested scanning. If the quality of the currently accessed link is degraded, a Link_Going_Down trigger is transmitted to the MIH of the MSS (S1101). After searching for a new link, an IEEE 802.16 MAC transmits a Link_Available trigger to the MIH of the MSS (S1102).

Thereafter, the IEEE 802.16 MAC of the MSS receives and decodes a DL-MAP, which is transmitted each frame (S1103) from the base station. Furthermore, the IEEE 802.16 MAC checks an interval to know when a downlink channel descriptor (DCD) is transmitted (S1105). The mobile subscriber station having received the DCD can acquire a burst profile used in coding a broadcast message by a current base station. Accordingly, the mobile subscriber station can decode a received broadcast message using the burst profile. By receiving the DL-MAP (S1106), the MSS can check when a Neighbor Advertisement (MOB_NBR-ADV) message is transmitted in order to receive the message. MIH Capability information and IS Support information of the current base station are acquired by decoding the received Neighbor Advertisement (MOB_NBR-ADV) using a downlink burst profile acquired via the DCD (S1107). The mobile subscriber station then delivers the MIH Capability information and IS Support information of the current base station to its MIH via an MIH_capability.indication primitive (S1108), wherein the primitive can be delivered to an upper management entity (S1108).

In case of attempting a handover from one IEEE 802.16 base station to another IEEE 802.16 base station, or in case of executing an initial network entry procedure by powering a multi-mode mobile subscriber station within the IEEE 802.16 base station, the multi-mode mobile subscriber station can acquire MIH Capability and IS Support information via a MOB_NBR-ADV message according to the embodiment shown in FIG. 11.

Accordingly, the present invention provides the following advantages. First, a multi-mode mobile subscriber station attempting handover to a broadband wireless access system from another interface network (e.g., IEEE 802.11, 3GPP, 3GPP2), a mobile subscriber station attempting handover to another base station within the same broadband wireless access system, or a mobile subscriber station executing an initial network entry procedure within a base station of a broadband wireless access system, acquires MIH Capability and IS Support information of a target base station by attempting a connection to the base station, thereby easily recognizing the capability of the target base station associated with Media Independent Handover.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of data communication in a mobile terminal for supporting a handover of the mobile terminal, the method comprising:
   transmitting to a base station a request message comprising media independent handover (MIH) capability information which indicates whether the mobile terminal supports an MIH function associated with handover between heterogeneous networks and a first indicator indicating whether the mobile terminal supports an information service, the request message transmitted during an initial network entry procedure for capability negotiation with the base station; and
   receiving from the base station a response message in response to the request message, the response message comprising media independent handover (MIH) capability information which indicates whether the base station supports an MIH function associated with handover between the heterogeneous networks, the response message received during the initial network entry procedure for the capability negotiation.

2. The method of claim 1, wherein the request message is a basic capability request (SBC-REQ) message and the response message is a basic capability response (SBC-RSP) message.

3. The method of claim 1, wherein the request message further comprises at least one of a second indicator indicating whether the mobile terminal supports an event service and a third indicator indicating whether the mobile terminal supports a command service.

4. The method of claim 1, wherein the response message further comprises at least one of a first indicator indicating whether the base station supports an information service, a second indicator indicating whether the base station supports an event service and a third indicator indicating whether the base station supports a command service.

5. The method of claim 1, wherein the request message further comprises information about a type of MIH service supported by the MIH function of the mobile terminal.

6. The method of claim 1, wherein the response message further comprises information about a type of MIH service supported by the MIH function of the base station.

7. A method of data communication at a base station for supporting a handover of a mobile terminal, the method comprising:
   receiving from the mobile terminal a request message comprising media independent handover (MIH) capability information which indicates whether the mobile terminal supports an MIH function associated with handover between heterogeneous networks and a first indicator indicating whether the mobile terminal supports an information service, the request message received during an initial network entry procedure for capability negotiation with the base station; and
   transmitting to the mobile terminal a response message in response to the request message, the response message comprising media independent handover (MIH) capability information which indicates whether the base station supports an MIH function associated with handover between the heterogeneous networks, the response message transmitted during the initial network entry procedure for the capability negotiation.

8. The method of claim 7, wherein if the base station supports the MIH function then the mobile terminal communicates with the base station using a medium access control management message.

9. The method of claim 7, further comprising:
   receiving a scan request from the mobile terminal through a broadband wireless access network interface prior to receiving the request message.

10. The method of claim 7, wherein the response message is transmitted through a medium access control of the broadband wireless access network interface.

11. The method of claim 7, wherein the response message further comprises at least one of an information service support indicator, an event service support indicator and a command service support indicator.

12. The method of claim 7, wherein the response message is one of a broadcast message, a frame check header message, a registration response message, a subscriber station basic capability response message, and a neighbor base station broadcast message.

13. The method of claim 7, wherein the request message further comprises at least one of a second indicator indicating whether the mobile terminal supports an event service and a third indicator indicating whether the mobile terminal supports a command service.

14. The method of claim 7, wherein the request message further comprises information about a type of MIH service supported by the MIH function of the mobile terminal.

15. The method of claim 7, wherein the response message further comprises information about a type of MIH service supported by the MIH function of the base station.

16. A mobile terminal supporting a media independent handover, the mobile terminal comprising:
   a transmitter for transmitting to a base station a request message comprising media independent handover (MIH) capability information which indicates whether the mobile terminal supports an MIH function associated with handover between heterogeneous networks and a first indicator indicating whether the mobile terminal supports an information service, the request message transmitted during an initial network entry procedure for capability negotiation with the base station; and a receiver for receiving from the base station a response message in response to the request message, the response message comprising media independent handover (MIH) capability information which indicates whether the base station supports an MIH function associated with handover between the heterogeneous networks, the response message received during the initial network entry procedure for the capability negotiation.

* * * * *